(12) United States Patent
Tanizawa et al.

(10) Patent No.: US 10,020,893 B2
(45) Date of Patent: Jul. 10, 2018

(54) COMMUNICATION DEVICE, QUANTUM KEY DISTRIBUTION SYSTEM, QUANTUM KEY DISTRIBUTION METHOD, AND COMPUTER PROGRAM PRODUCT

(71) Applicant: Kabushiki Kaisha Toshiba, Minato-ku (JP)

(72) Inventors: Yoshimichi Tanizawa, Yokohama (JP); Akira Murakami, Kawasaki (JP); Alex Dixon, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/265,179

(22) Filed: Sep. 14, 2016

(65) Prior Publication Data
US 2017/0279540 A1 Sep. 28, 2017

(30) Foreign Application Priority Data
Mar. 23, 2016 (JP) ................................. 2016-057983

(51) Int. Cl.
*H04B 10/25* (2013.01)
*H04B 10/70* (2013.01)
(Continued)

(52) U.S. Cl.
CPC ......... *H04B 10/70* (2013.01); *H04B 10/0705* (2013.01); *H04L 9/0858* (2013.01); *G06F 2221/2151* (2013.01)

(58) Field of Classification Search
CPC ... H04L 9/0858; H04L 9/0852; H04L 9/3236; H04B 10/70
(Continued)

(56) References Cited

U.S. PATENT DOCUMENTS 8,855,316 B2 * 10/2014 Wiseman .............. H04L 9/0855
380/277
2009/0260942 A1 * 10/2009 Matsuda .................. F16D 13/04
192/54.52
(Continued)

FOREIGN PATENT DOCUMENTS

WO    WO 2013/112351    * 8/2013 .............. H04J 14/08

OTHER PUBLICATIONS

Nino Walenta, et al., "A fast and Versatile QKD System with Hardware Key Distillation and Wavelength Multiplexing" New Journal of Physics 16, 013047, 2014, 20 Pages.

*Primary Examiner* — Don N Vo
(74) *Attorney, Agent, or Firm* — Oblon, McClelland, Maier & Neustadt, L.L.P.

(57) ABSTRACT

According to an embodiment, a communication device is connected to another communication device through a quantum communication channel and a classical communication channel to share an encryption key. The device includes a photon detector, a measurer, a difference generator, and a transmitter. The photon detector is configured to detect photons transmitted from the other communication device through the quantum communication channel. The measurer is configured to measure time when each photon is detected by the photon detector as time stamp information. The difference generator is configured to generate difference time stamp information as a difference between time obtained by adding particular information to the time indicated by the time stamp information previously measured by the measurer and time indicated by the time stamp information subsequently measured by the measurer. The transmitter is configured to transmit the difference time stamp information to the other communication device through the classical communication channel.

10 Claims, 12 Drawing Sheets

(51) Int. Cl.
*H04B 10/07* (2013.01)
*H04L 9/08* (2006.01)

(58) Field of Classification Search
USPC .......................................................... 398/25
See application file for complete search history.

(56) References Cited

U.S. PATENT DOCUMENTS

2010/0195831 A1* 8/2010 Tanaka ................. H04B 10/548
 380/256
2017/0099272 A1* 4/2017 Fiske .................... H04L 63/061

\* cited by examiner

COMMUNICATION DEVICE, QUANTUM KEY DISTRIBUTION SYSTEM, QUANTUM KEY DISTRIBUTION METHOD, AND COMPUTER PROGRAM PRODUCT

CROSS-REFERENCE TO RELATED APPLICATION

This application is based upon and claims the benefit of priority from Japanese Patent Application No. 2016-057983, filed on Mar. 23, 2016; the entire contents of which are incorporated herein by reference.

FIELD

Embodiments described herein relate generally to a communication device, a quantum key distribution system, a quantum key distribution method, and a computer program product.

BACKGROUND

A quantum key distribution system is configured by including a transmitter, a receiver, and an optical fiber link connecting them together. The transmitter continuously transmits single photons to the receiver through the optical fiber link (quantum communication channel) serving as a communication channel of an optical fiber. The transmitter and the receiver then exchange control information with each other so as to securely share an encryption key between the transmitter and the receiver. This technique is achieved using a technology generally called quantum key distribution (QKD).

In the quantum key distribution, the photons used for sharing the encryption key follow the uncertainty principle that is one of basic principles of quantum mechanics and states that a physical state is changed by being observed. Based on this principle, if an eavesdropper observes the photons including the information on the encryption key transmitted by the transmitter in the quantum communication channel, the physical state of the photons changes, so that the receiver that has received the photons can detect that the photons have been observed by the eavesdropper. As a result, a secure encryption key assured to have not been tapped can be obtained by exchanging the control information between the transmitter and the receiver based on the sequence of photons obtained by the transmitter and the sequence of photons detected by the receiver.

Each application connected to corresponding one of two nodes (such as the transmitter and the receiver described above) or included in corresponding one of the nodes uses the above-described encryption key shared between the two nodes to perform encrypted data communication, for example, using an encrypted communication method called one-time pad. The one-time pad refers to an encrypted communication method to encode or decode data to be transmitted or received using an encryption key having the same size as that of the data, and to discard the encryption key after being used once. The encrypted data communication using the one-time pad is guaranteed by information theory to be indecipherable by any eavesdropper having any knowledge. The technology for performing the encrypted data communication using the secure encryption key shared through the quantum key distribution as described above is called quantum cryptographic technology.

A secure key rate (encryption key distribution rate or encryption key generation rate) serving as a basic performance indicator of the quantum key distribution is defined as a length (bit-length) of an encryption key that can be generated and shared per unit time. A quantum key distribution system that can share more encryption keys per unit time can be said to have a capability of high-speed quantum key distribution. Achieving a high-speed quantum key distribution can improve the speed and security of the encrypted data communication using the encryption key that has been generated and shared. Therefore, it is important to improve the secure key rate in the quantum key distribution. The quantum key distribution is basically constituted by four processing steps. A first processing step is a photon transmission/reception processing step. A second processing step is a sifting processing step. A third processing step is an error correction processing step. A fourth processing step is a privacy amplification processing step. These four processing steps need to be quickened to improve the secure key rate.

A factor that hampers speeding up of the sifting processing among the four processing steps described above is time stamp communication in which the receiver transmits information (hereinafter, called "time stamp information" in some cases) on time when a single photon is detected to the transmitter. One piece of the time stamp information needs to be transmitted (through the time stamp communication) for one detected photon, so that, in order to achieve higher-speed quantum key distribution, an increase in the number of detected photons per unit time increases the amount of the time stamp communication required per unit time. When a physical limit of a communication channel for performing the time stamp communication is reached, the sifting processing cannot be operated. Although a countermeasure can be considered in which the band of the communication channel for the time stamp communication is widened, such a countermeasure is difficult to be taken in some cases due to problems in structure and cost of hardware for carrying out the countermeasure.

A technique has been developed in which, in the sifting processing, information on a difference between time of previous detection of a photon and time of current detection of a photon is transmitted as the time stamp information, instead of transmitting the time information itself as the time stamp information to be transmitted in the time stamp communication.

The technique described above can compress the time stamp information, and thus can reduce the amount of the time stamp communication, that is, can increase the processing rate of the sifting processing. The sifting processing rate is, however, not sufficiently increased by application of the technique described above. To further increase the secure key rate, the sifting processing rate needs to be increased by further reducing the amount of the time stamp communication.

DETAILED DESCRIPTION

According to an embodiment, a communication device is connected to another communication device through a quantum communication channel and a classical communication channel to share an encryption key with the other communication device. The communication device includes a photon detector, a measurer, a difference generator, and a transmitter. The photon detector is configured to detect photons transmitted from the other communication device through the quantum communication channel. The measurer is configured to measure time when each of the photons is detected by the photon detector as time stamp information. The difference generator is configured to generate difference time stamp information as a difference between time obtained by adding particular information to the time indicated by the time stamp information previously measured by the measurer and time indicated by the time stamp information subsequently measured by the measurer. The transmitter is configured to transmit the difference time stamp information to the other communication device through the classical communication channel.

The following describes in detail a communication device, a quantum key distribution system, a quantum key distribution method, and a computer program according to embodiments of the present invention with reference to the accompanying drawings. The drawings are only schematic, so that specific configurations thereof should be determined in consideration of the following description.

First Embodiment

Figure 1:
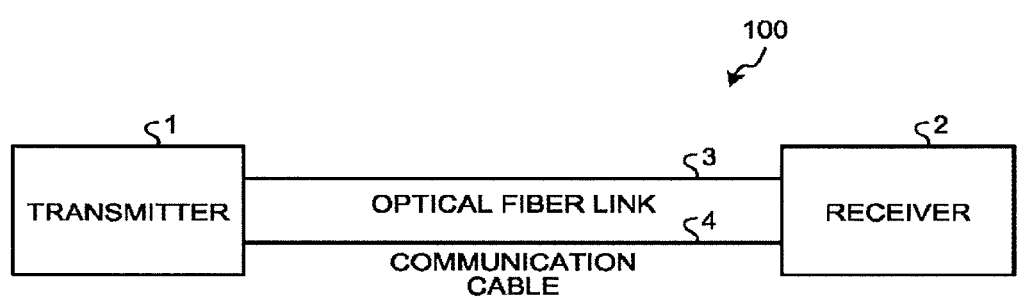
FIG. 1 is a diagram illustrating an example of an overall configuration of a quantum key distribution system.

FIG. 1 is a diagram illustrating an example of an overall configuration of a quantum key distribution system. The configuration of this quantum key distribution system 100 will be described with reference to FIG. 1.

As illustrated in FIG. 1, the quantum key distribution system 100 is configured by including a transmitter 1 (other communication device or second communication device), a receiver 2 (communication device or first communication device), an optical fiber link 3, and a communication cable 4.

The transmitter 1 is a transmitter that transmits a sequence of photons that consists of single photons and serves as a base for generating an encryption key to the receiver 2 through the optical fiber link 3. The transmitter 1 performs, for example, key distillation processing (sifting processing, error correction processing, and privacy amplification processing) to be described later based on the transmitted sequence of photons to generate the encryption key. When performing the key distillation processing, the transmitter 1 exchanges control data (not the single photons, but general digital data, which is hereinafter called "key distillation processing data" in some cases) with the receiver 2 through the communication cable 4. The communication cable 4 serving as a communication path for the key distillation processing data and data communicated by an application is called a "classical communication channel" in some cases. The key distillation processing data may be transferred through the optical fiber link 3, instead of through the communication cable 4, between the transmitter 1 and the receiver 2, or may be transferred using another communication path (such as a general Internet line). In this case, the optical fiber link 3 or the other communication path serves as a classical communication channel.

The receiver 2 is a receiver that receives the sequence of photons that consists of single photons and serves as the base for generating the encryption key from the transmitter 1 through the optical fiber link 3. The receiver 2 performs, for example, the key distillation processing (sifting processing, error correction processing, and privacy amplification processing) to be described later based on the received sequence of photons to generate the same encryption key as that generated by the transmitter 1. When performing the key distillation processing, the receiver 2 exchanges the control data (key distillation processing data) with the transmitter 1 through the communication cable 4.

The optical fiber link 3 is an optical fiber cable that functions as a quantum communication channel serving as a transmission path of the single photons output by the transmitter 1. The communication cable 4 is a cable serving as a classical communication channel for communicating the key distillation processing data and, as will be described later, the communication data of the application, between the transmitter 1 and the receiver 2.

In the quantum key distribution system 100 including the transmitter 1 and the receiver 2 described above, if an eavesdropper observes the photons transmitted by the transmitter 1 on the optical fiber link 3, the physical state of the photons changes, so that the receiver 2 that has detected the photons can find out that the photons have been observed by the eavesdropper. That is, the eavesdropping by the eavesdropper can be detected.

Figure 2:
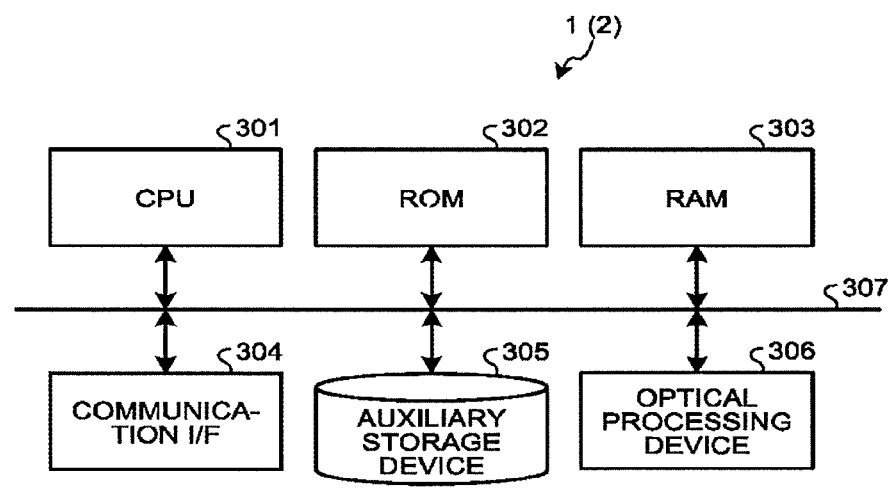
FIG. 2 is a diagram illustrating an example of a hardware configuration of each of a transmitter and a receiver.

FIG. 2 is a diagram illustrating an example of a hardware configuration of each of the transmitter and the receiver. The hardware configuration of each of the transmitter 1 and the receiver 2 will be described with reference to FIG. 2.

As illustrated in FIG. 2, the transmitter 1 (receiver 2) includes a central processing unit (CPU) 301, a read-only memory (ROM) 302, a random access memory (RAM) 303, a communication interface (I/F) 304, an auxiliary storage device 305, and an optical processing device 306.

The CPU 301 is an arithmetic device that controls the overall operation of the transmitter 1 (receiver 2). The ROM 302 is a nonvolatile storage device that stores programs, including, for example, a basic input/output system (BIOS) or firmware, executed by the CPU 301 to control functions. The RAM 303 is a volatile storage device that serves as a work memory of the CPU 301.

The communication I/F 304 is an interface for performing data communication through the classical communication channels (such as the communication cable 4). The communication I/F 304 may be an interface supporting an Ethernet (registered trademark) standard, such as 10Base-T, 100Base-TX, or 1000Base-T, or may be an interface for an optical fiber.

The auxiliary storage device 305 is a nonvolatile storage device that stores and accumulates, for example, various programs to be executed by the CPU 301, and data and the encryption key generated in the process of the encryption key sharing operation. The auxiliary storage device 305 is a storage device capable of electric, magnetic, or optical storage, such as a hard disk drive (HDD), a solid state drive (SSD), a flash memory, or an optical disc drive.

The optical processing device 306 is an optical device that transmits or receives the single photons through the quantum communication channel. The optical processing device 306 of the transmitter 1 transmits each of the single photons generated so as to correspond to a phase state or a polarization state based on a transmission signal bit serving as bit information generated, for example, using a random number and basis information (transmission basis) generated and selected, for example, using a random number in the same manner as described above, to the optical processing device 306 of the receiver 2 through the quantum communication channel (optical fiber link 3 illustrated in FIG. 1). That is, each of the photons transmitted by the optical processing device 306 of the transmitter 1 includes transmission signal bit information of one bit that is "0" or "1". The optical processing device 306 of the receiver 2 receives the photon from the optical processing device 306 of the transmitter 1 through the quantum communication channel, and reads the received photon based on basis information (reception basis) that has been randomly generated and selected, and thereby obtains reception signal bit information of one bit (not necessarily agreeing with the transmission signal bit information) corresponding to the transmission signal bit information. The optical processing device 306 continuously performs the transmission/reception processing of the single photon.

The CPU 301, the ROM 302, the RAM 303, the communication I/F 304, the auxiliary storage device 305, and the optical processing device 306 are connected so as to be capable of communicating with one another through a bus 307 including an address bus, a data bus, and the like.

Figure 3:
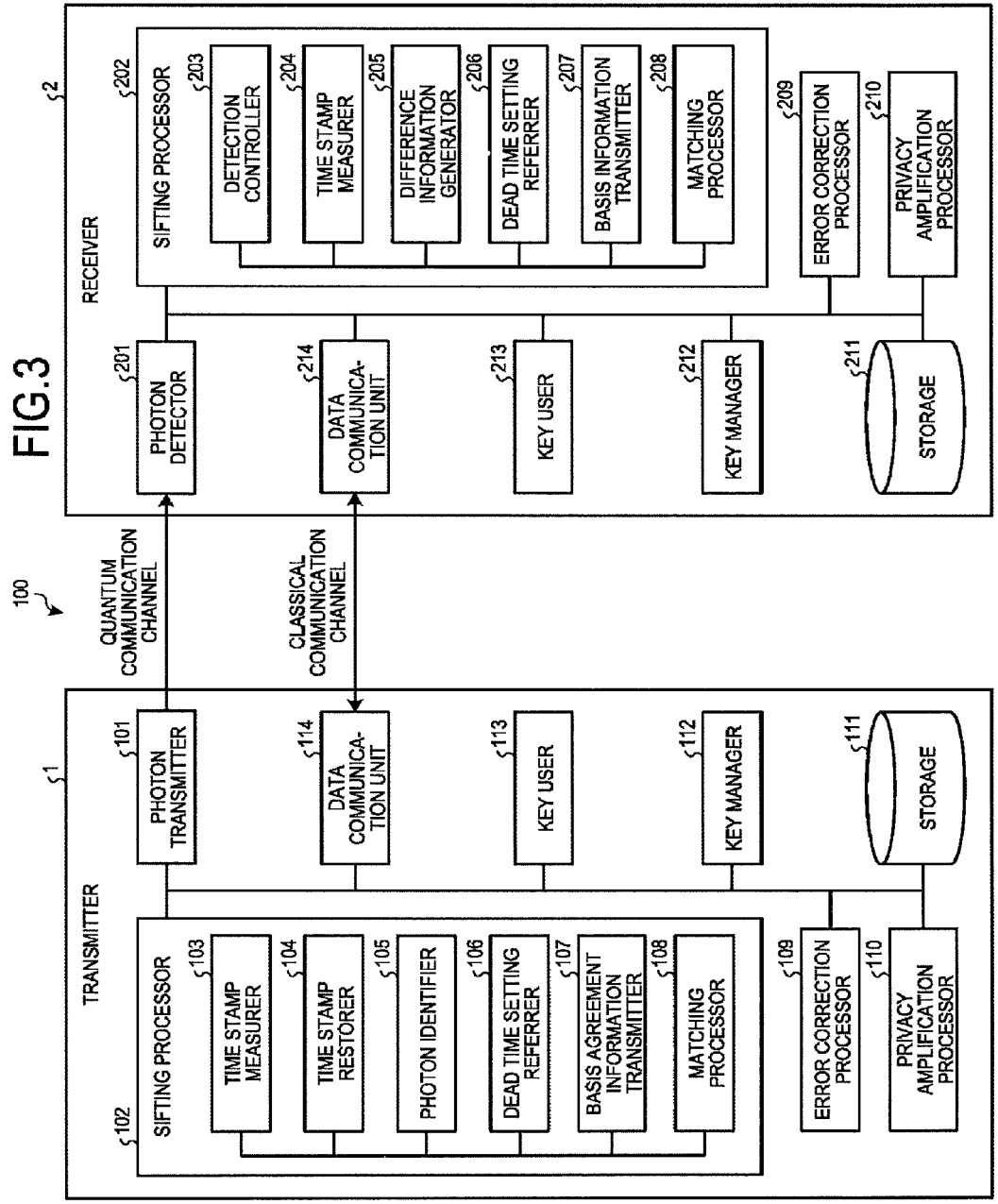
FIG. 3 is a diagram illustrating an example of a configuration of functional blocks in a first embodiment.

FIG. 3 is a diagram illustrating an example of a configuration of functional blocks in the quantum key distribution system according to the first embodiment. The following describes the configuration and operations of the functional blocks in the transmitter 1 and the receiver 2 of the quantum key distribution system 100 with reference to FIG. 3.

As illustrated in FIG. 3, the transmitter 1 includes a photon transmitter 101, a sifting processor 102, an error correction processor 109, a privacy amplification processor 110, a storage 111, a key manager 112, a key user 113, and a data communication unit 114 (receiver).

The photon transmitter 101 is a functional unit that performs the photon transmission processing to transmit the single photon generated so as to correspond to the phase state or the polarization state based on the transmission signal bit serving as the bit information generated, for example, using a random number and the basis information (transmission basis) generated and selected, for example, using a random number in the same manner as described above, to a photon detector 201 of the receiver 2 through the quantum communication channel (optical fiber link 3 illustrated in FIG. 1).

In the photon transmission processing performed by the photon transmitter 101, for example, a light source obtained by attenuating an ordinary laser light source is used as a generation source of the single photon. Using the ordinary laser light source may deliver, in some cases, a plurality of photons, instead of exactly a single photon, when the photon transmitter 101 encodes the transmission basis and the transmission signal bit information. To eliminate such cases and ensure security of the quantum key distribution, a method called a decoy method may be used. In the decoy method, the intensity of the output laser beam is not always constant, but, at a certain probability, the photon is transmitted in a laser beam at a different intensity level from that when a normal transmission signal bit is transmitted. The transmission operation of the single photon (photon transmission processing) may be performed by pulse driving the laser light source described above. The rate of the pulse driving is high, and may be, for example, 1 GHz, or may be higher or lower than 1 GHz.

The photon transmitter 101 transmits the transmission signal bit and the transmission basis that have been generated to the sifting processor 102. The photon transmitter 101 is implemented, for example, by the optical processing device 306 illustrated in FIG. 2.

The sifting processor 102 is a functional unit that receives the basis information (reception basis) generated by the photon detector 201 of the receiver 2 through the classical communication channel, and performs the sifting processing to compare the received reception basis with the transmission basis to extract only transmission signal bits corresponding to parts where the reception bases agree with the transmission bases so as to generate a shared bit sequence. The sifting processor 102 transmits the generated shared bit sequence to the error correction processor 109. The sifting processing is broadly divided into time stamp sifting processing and basis sifting processing. The sifting processing including the time stamp sifting processing and the basis sifting processing will be described later in detail. The sifting processor 102 includes a time stamp measurer 103 (second measurer), a time stamp restorer 104 (restorer), a photon identifier 105 (identifier), a dead time setting referrer 106, a basis agreement information transmitter 107, and a matching processor 108.

The time stamp measurer 103 is a functional unit that measures transmission time stamp information (second time stamp information) serving as information indicating time when the single photon is transmitted by the photon transmitter 101. The time stamp measurer 103 stores in the storage 111 the measured transmission time stamp information, together with the transmission signal bit information and the transmission basis information that have been received from the photon transmitter 101. The information consisting of the transmission signal bit information, the transmission basis information, and the transmission time stamp information is called transmission photon information in some cases. The time stamp measurer 103 may store the measured transmission time stamp information in a cache memory or the like that allows high-speed reading.

The time stamp restorer 104 is a functional unit that receives information (communication time stamp information) on time when a photon was detected on the receiver 2 side through a data communication unit 214 (to be described later) of the receiver 2, and that restores information (reception time stamp information) indicating the time when the photon is currently detected by the receiver 2 based on information (reception time stamp information) that is stored in the cache memory (or the storage 111) and indicates time when a photon was previously detected by the receiver 2, on the currently received communication time stamp information, and on a dead time acquired from the dead time setting referrer 106 (to be described later).

The photon identifier 105 is a functional unit that compares the information (reception time stamp information) indicating the time restored by the time stamp restorer 104 with the time stamp information (transmission time stamp information) included in the transmission photon information measured by the time stamp measurer 103 and stored in the storage 111 so as to identify which of the photons transmitted from the photon transmitter 101 has been detected by the receiver 2. When the transmission photon information turns out to correspond to the photon identified by the photon identifier 105 to be detected by the receiver 2, the transmission photon information is transmitted to the matching processor 108.

The matching processor 108 is a functional unit that compares the reception bases received from the receiver 2 through the classical communication channel and the data communication unit 114 with the transmission bases included in the transmission photon information received from the photon identifier 105 so as to extract the transmission signal bits corresponding to bases where the reception bases agree with the transmission bases, and thus generates the shared bit sequence. The matching processor 108 stores the generated shared bit sequence in the storage 111, and transmits the shared bit sequence to the error correction processor 109. The matching processor 108 obtains, as a result of the matching processing, information (basis agreement information) on whether each of the received reception bases agrees with the corresponding transmission basis, and transmits the obtained information to the basis agreement information transmitter 107.

The basis agreement information transmitter 107 is a functional unit that transmits the basis agreement information received from the matching processor 108 to the receiver 2 through the data communication unit 114 and the classical communication channel.

The dead time setting referrer 106 is a functional unit that refers to setting information on the dead time (an example of particular information) that has been set on the receiver 2 side in order to restrain erroneous detection of photons caused by after-pulses of an avalanche photodiode (APD) of the photon detector 201 (to be described later). Any method can be used to transmit the setting information on the dead time from the receiver 2 to the dead time setting referrer 106 of the transmitter 1. The dead time setting referrer 106 may store in advance the preset dead time in the storage 111. Although the value of the dead time is assumed to be set in advance by an operator of the system, the value of the dead time may be automatically set according to the operating environment of the system, or alternatively, the value of the dead time can be dynamically changed based on fluctuations in characteristics, such as an error rate in the photon detection in the receiver 2, while the system is in operation.

The error correction processor 109 is a functional unit that exchanges control information for error correction (error correction (EC) information) with an error correction processor 209 of the receiver 2 through the classical communication channel so as to perform the error correction processing to correct bit errors in the shared bit sequence to generate a corrected bit sequence. The error correction processor 109 transmits the corrected bit sequence thus generated to the privacy amplification processor 110. As a result, the corrected bit sequence generated by the error correction processor 109 fully agrees with a corrected bit sequence generated through the error correction processing by the error correction processor 209 (to be described later).

The privacy amplification processor 110 is a functional unit that generates the encryption key by applying the privacy amplification processing to the corrected bit sequence so as to discard bits that may have been leaked and tapped by the eavesdropper in a theoretical sense through the photon transmission processing, the sifting processing, and the error correction processing. At this time, the privacy amplification processor 110 may exchange control information (privacy amplification (PA) information) with a privacy amplification processor 210 of the receiver 2 through the classical communication channel. The privacy amplification processor 110 stores and accumulates the generated encryption key in the storage 111.

The storage 111 is a functional unit that stores, for example, the transmission photon information, the shared bit sequence, and the encryption key. The storage 111 is implemented, for example, by the auxiliary storage device 305 illustrated in FIG. 2. The storage 111 is not limited to storing all pieces of the data mentioned above as one device. For example, another storage different from the storage 111 may be present to store only the transmission photon information. The encryption key may be stored in another storage different from the storage 111.

The key manager 112 is a functional unit that performs management (key management) of the encryption key stored (accumulated) in the storage 111. The key manager 112 provides the encryption key stored in the storage 111 to the key user 113 that is, for example, an application that performs the encrypted data communication.

The key user 113 is, for example, an application that makes use (key use) of the encryption key provided by the key manager 112 to perform the encrypted data communication.

The key manager 112 and the key user 113 need not necessarily be provided, but may be excluded if not needed.

The data communication unit 114 is a functional unit that communicates data with the receiver 2 through the classical communication channel. The data communication unit 114 is implemented, for example, by the communication I/F 304 illustrated in FIG. 2.

The sifting processor 102, the error correction processor 109, the privacy amplification processor 110, the key manager 112, and the key user 113, which have been described above, are implemented, for example, by the CPU 301 illustrated in FIG. 2 that reads a program stored, for example, in the auxiliary storage device 305 into the RAM 303, and executes the program. The sifting processor 102, the error correction processor 109, the privacy amplification processor 110, the key manager 112, and the key user 113 are not limited to being all implemented by execution of the program. At least any one of these units may be implemented, for example, as a hardware circuit, such as an application-specific integrated circuit (ASIC), a field-programmable gate array (FPGA), or another integrated circuit.

The photon transmitter 101, the sifting processor 102, the time stamp measurer 103, the time stamp restorer 104, the photon identifier 105, the dead time setting referrer 106, the basis agreement information transmitter 107, the matching processor 108, the error correction processor 109, the privacy amplification processor 110, the storage 111, the key manager 112, the key user 113, and the data communication unit 114, which are illustrated in FIG. 3, are conceptual representations of the functions thereof, and are not limited to being configured in such a manner. For example, a plurality of functional units illustrated as independent functional units in the transmitter 1 illustrated in FIG. 3 may be configured as one functional unit. In a converse manner, a function provided by one functional unit in the transmitter 1 illustrated in FIG. 3 may be divided into a plurality of functions, and configured as a plurality of functional units.

As illustrated in FIG. 3, the receiver 2 includes the photon detector 201, a sifting processor 202, the error correction processor 209 (corrector), the privacy amplification processor 210 (privacy amplifier), a storage 211, a key manager 212, a key user 213, and the data communication unit 214 (transmitter).

The photon detector 201 is a functional unit that receives the photon transmitted from the photon transmitter 101 of the transmitter 1 through the quantum communication channel, and performs photon detection processing to read the received photon based on the randomly selected basis information (reception basis) so as to obtain the reception signal bit information corresponding to the transmission signal bit information. The photon transmission processing by the photon transmitter 101 and the photon detection processing by the photon detector 201 are both called the "photon transmission/reception processing" in some cases.

The photon detector 201 may perform the photon detection processing using, for example, a photon detecting element called the avalanche photodiode (APD). The APD is an element made of, for example, indium gallium arsenide, silicon, germanium, or gallium nitride. The APD is driven in an operation mode called Geiger mode. Geiger mode is a mode of operating the APD at a reverse voltage equal to or higher than a breakdown voltage. In Geiger mode, an avalanche effect is used to generate a large pulse in response to an incident photon, and the pulse is detected to detect the single photon. For example, in the photon detection processing, a voltage higher than the breakdown voltage and a voltage lower than the breakdown voltage are alternately generated to apply a square wave formed or sinusoidal voltage to the APD, and thereby, the detection operation of single photons is continuously performed. The rate of driving the square wave formed or sinusoidal voltage is high, and may be, for example, 1 GHz, or may be higher or lower than 1 GHz. In the photon detection processing, the received photon is decoded so as to correspond to a phase state or a polarization state of light determined by the reception basis corresponding to the photon, and obtains, as a result of the decoding, the reception signal bit information of one bit (not necessarily agreeing with the transmission signal bit information) corresponding to the transmission signal bit information. When the photon transmitter 101 described above generates the transmission basis, and when the photon detector 201 generates the reception basis, the two kinds of bases are basically randomly selected at a probability of 50 to 50. However, to more efficiently generate and share the encryption key, the probability may be uneven so as to generate the transmission basis and the reception basis at a different ratio.

The photon detector 201 transmits the acquired reception signal bit and the generated reception basis to the sifting processor 202. The photon detector 201 is implemented, for example, by the optical processing device 306 illustrated in FIG. 2.

The sifting processor 202 is a functional unit that receives the above-described basis agreement information transmitted by the basis agreement information transmitter 107 of the transmitter 1 through the classical communication channel and extracts the reception signal bits where the reception bases agree with the transmission bases from the received basis agreement information and the reception signal bit information received from the photon detector 201, thereby performing the sifting processing to generate the shared bit sequence. The sifting processor 202 transmits the generated shared bit sequence to the error correction processor 209. The shared bit sequence generated by the sifting processor 202 is a bit sequence constituted by the reception signal bits. The shared bit sequence generated by the sifting processor 102 is a bit sequence constituted by the transmission signal bits. Theses bit sequences do not necessarily agree with each other. The sifting processing performed by the sifting processor 202 is also broadly divided into the time stamp sifting processing and the basis sifting processing. The sifting processing including the time stamp sifting processing and the basis sifting processing will be described later in detail. The sifting processor 202 includes a detection controller 203, a time stamp measurer 204 (measurer or first measurer), a difference information generator 205, a dead time setting referrer 206 (referrer), a basis information transmitter 207, and a matching processor 208.

The detection controller 203 is a functional unit that restrains, in order to restrain the erroneous detection of photons caused by the after-pulses (to be described later), the photon detector 201 from performing, for example, the detection operation of photons for a predetermined time determined by the preset dead time after the photon detector 201 performs the detection of photons to be detected.

In the APD described above, a phenomenon called an after-pulse can occur after a photon is detected. The after-pulse refers to a pulse generated as follows: electrons generated by the avalanche effect as a result of the photon detection are trapped in lattice defects in the APD, and are released at a delayed time to generate the pulse. The after-pulse serves as a pulse at a different time from the time of detection of the photon to be detected, and thereby serves as noise affecting the photon detection. Hence, when the APD is driven at a high rate, the noise caused by the after-pulse needs to be removed to improve accuracy of the photon detection. A method for removing the after-pulse is known in which pulses generated in a predetermined period after the detection of the photon to be detected is performed are ignored. In this method, after the detection of the photon to be detected, photons are not detected during the predetermined period (which is called the "dead time"), or alternatively, pulses generated during the predetermined period are ignored as not the detection of the photons to be detected. A designer or the operator can set the value of the dead time based on a parameter, for example, a characteristic value, such as an after-pulse probability of the APD, or an operational rate of driving of the APD. Such a method can remove or reduce the noise caused by the after-pulse, and thus can improves the accuracy of the photon detection.

Although the detection controller 203 is included in the sifting processor 202, the photon detector 201 and the detection controller 203 may be implemented as one unit. In this case, the detection controller 203 is implemented, for example, by the optical processing device 306 illustrated in FIG. 2.

The time stamp measurer 204 is a functional unit that receives the reception signal bit information and the reception basis information corresponding to the detected photon from the photon detector 201, and that measures the reception time stamp information (first time stamp information) serving as information indicating time when the photon is detected. The time stamp measurer 204 transmits the measured reception time stamp information to the difference information generator 205. The time stamp measurer 204 stores the reception signal bit information and the reception basis information as "detection photon information" in the storage 211.

The difference information generator 205 is a functional unit that generates difference information (difference time stamp information) on the time when the photon was detected based on the reception time stamp information that has previously been received from the time stamp measurer 204 and is stored in a cache memory (or the storage 211), the reception time stamp information currently received from the time stamp measurer 204, and the dead time acquired from the dead time setting referrer 206. The difference information generator 205 transmits the generated difference time stamp information as the communication time stamp information to the transmitter 1 through the data communication unit 214. The difference information generator 205 stores the currently received reception time stamp information in the cache memory (storage 211), and uses it for generating the difference time stamp information next time.

The dead time setting referrer 206 is a functional unit that refers to the setting information on the dead time that has been set so as to restrain the erroneous detection of photons caused by the after-pulses of the APD of the photon detector 201. The preset dead time may be stored in advance in the storage 211. The dead time is applied to the detection controller 203, and also to the difference information generator 205 via the dead time setting referrer 206. Although the value of the dead time is assumed to be set in advance by the operator of the system, the value of the dead time may be automatically set according to the operating environment of the system, or alternatively, the value of the dead time can be dynamically changed based on fluctuations in characteristics, such as an error rate in the photon detection in the photon detector 201, while the system is in operation. The dead time of the transmitter 1 described above is set to the same value as the dead time of the receiver 2. Since the transmitter 1 does not include any APD for which the dead time needs to be set, the dead time need not normally be set. However, the dead time is used for an operation of the time stamp restorer 104 of the transmitter 1 described above to restore the time stamp information.

Any method can be used to keep the dead times of the dead time setting referrer 106 and the dead time setting referrer 206 at the same value as each other. The dead time setting value in the dead time setting referrer 106 of the transmitter 1 may be changed by the operator who manually copies thereto the value in the dead time setting referrer 206 of the receiver 2, or by automatically transmitting the dead time setting value in the dead time setting referrer 206 of the receiver 2 to the transmitter 1 when the setting value in the dead time setting referrer 206 is changed. In a converse manner, the dead time setting value in the dead time setting referrer 206 of the receiver 2 may be changed by automatically transmitting the dead time setting value in the dead time setting referrer 106 of the transmitter 1 to the receiver 2 when the setting value in the dead time setting referrer 106 is changed.

The basis information transmitter 207 is a functional unit that transmits the reception basis information included in the "detection photon information" stored in the storage 211 to the transmitter 1 through the data communication unit 214 and the classical communication channel.

The matching processor 208 is a functional unit that extracts only the reception signal bits of the "detection photon information" having the reception basis agreeing with the transmission basis from the basis agreement information received from the transmitter 1 through the data communication unit 214 and the classical communication channel and the "detection photon information" stored in the storage 211, and thus generates the shared bit sequence. The matching processor 208 stores the generated shared bit sequence in the storage 211, and transmits the shared bit sequence to the error correction processor 209.

The error correction processor 209 is a functional unit that exchanges the control information for error correction (EC information) with the error correction processor 109 of the transmitter 1 through the classical communication channel so as to perform the error correction processing to correct bit errors in the shared bit sequence to generate a corrected bit sequence. The error correction processor 209 transmits the corrected bit sequence thus generated to the privacy amplification processor 210. As a result, the corrected bit sequence generated by the error correction processor 209 fully agrees with the corrected bit sequence generated through the error correction processing by the error correction processor 109.

The privacy amplification processor 210 is a functional unit that generates the encryption key by applying the privacy amplification processing to the corrected bit sequence so as to discard bits that may have been leaked and tapped by the eavesdropper in a theoretical sense through the photon transmission processing, the sifting processing, and the error correction processing. In this case, the privacy amplification processor 210 may exchange the control information (PA information) with the privacy amplification processor 110 of the transmitter 1 through the classical communication channel. The privacy amplification processor 210 stores and accumulates the generated encryption key in the storage 211.

The storage 211 is a functional unit that stores, for example, the detection photon information, the shared bit sequence, and the encryption key. The storage 211 is implemented, for example, by the auxiliary storage device 305 illustrated in FIG. 2. The storage 211 is not limited to storing all pieces of the data mentioned above as one device. For example, another storage different from the storage 211 may be present to store only the detection photon information. The encryption key may be stored in another storage different from the storage 211.

The key manager 212 is a functional unit that performs management (key management) of the encryption key stored (accumulated) in the storage 211. The key manager 212 provides the encryption key stored in the storage 211 to the key user 213 that is, for example, an application that performs the encrypted data communication.

The key user 213 is, for example, an application that makes use (key use) of the encryption key provided by the key manager 212 to perform the encrypted data communication.

The key manager 212 and the key user 213 need not necessarily be provided, but may be excluded if not needed.

The data communication unit 214 is a functional unit that communicates data with the transmitter 1 through the classical communication channel. The data communication unit 214 is implemented, for example, by the communication I/F 304 illustrated in FIG. 2.

The sifting processor 202, the error correction processor 209, the privacy amplification processor 210, the key manager 212, and the key user 213, which have been described above, are implemented, for example, by the CPU 301 illustrated in FIG. 2 that reads a program stored, for example, in the auxiliary storage device 305 into the RAM 303, and executes the program. The sifting processor 202, the error correction processor 209, the privacy amplification processor 210, the key manager 212, and the key user 213 are not limited to being all implemented by execution of the program. At least any one of these units may be implemented, for example, as a hardware circuit, such as an ASIC, an FPGA, or another integrated circuit.

The photon detector 201, the sifting processor 202, the detection controller 203, the time stamp measurer 204, the difference information generator 205, the dead time setting referrer 206, the basis information transmitter 207, the matching processor 208, the error correction processor 209, the privacy amplification processor 210, the storage 211, the key manager 212, the key user 213, and the data communication unit 214, which are illustrated in FIG. 3, are conceptual representations of the functions thereof, and are not limited to being configured in such a manner. For example, a plurality of functional units illustrated as independent functional units in the receiver 2 illustrated in FIG. 3 may be configured as one functional unit. In a converse manner, a function provided by one functional unit in the receiver 2 illustrated in FIG. 3 may be divided into a plurality of functions, and configured as a plurality of functional units.

Figure 4:
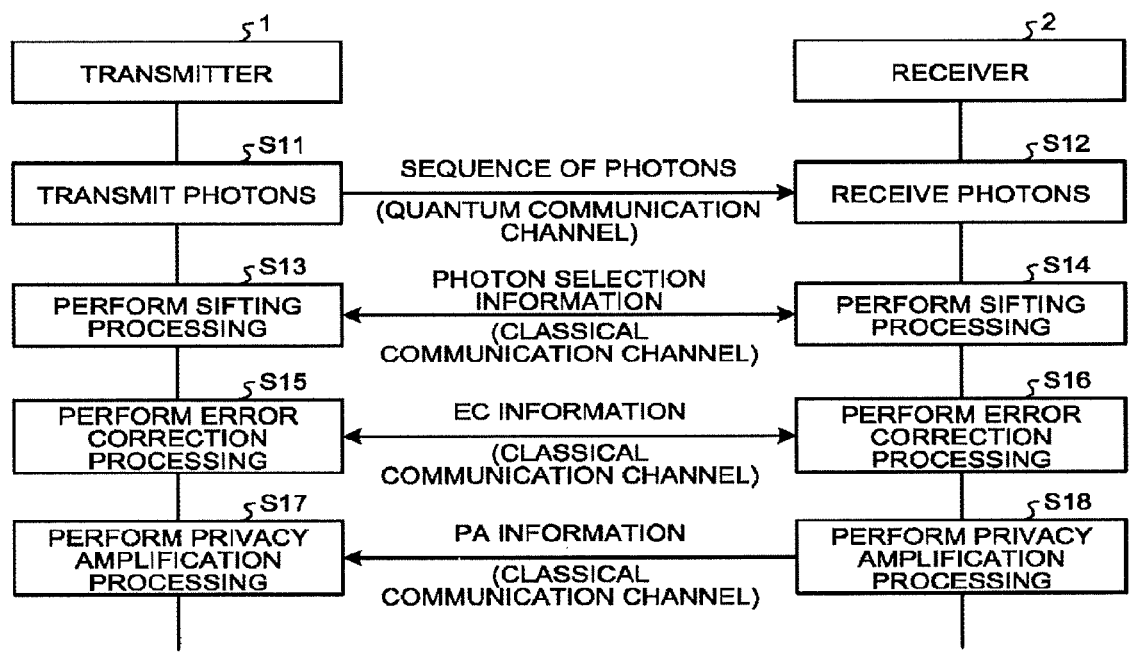
FIG. 4 is a sequence diagram illustrating an example of a flow of an encryption key sharing operation.

FIG. 4 is a sequence diagram illustrating an example of a flow of the encryption key sharing operation. The flow of the general encryption key sharing operation (quantum key distribution) will be described with reference to FIG. 4.

Step S11

The photon transmitter 101 transmits the single photons each generated so as to correspond to the phase state or the polarization state based on the transmission signal bit serving as the bit information generated, for example, using a random number and the basis information (transmission basis) generated and selected, for example, using a random number in the same manner as described above, to a photon detector 201 of the receiver 2 through the quantum communication channel. The photon transmitter 101 transmits the transmission signal bits and the transmission bases that have been generated to the sifting processor 102.

Step S12

The photon detector 201 receives the photons transmitted from the photon transmitter 101 of the transmitter 1 through the quantum communication channel, and reads the received photons based on the randomly selected basis information (reception bases) so as to obtain the reception signal bit information corresponding to the transmission signal bit information. The photon detector 201 transmits the acquired reception signal bits and the reception bases to the sifting processor 202.

Step S13

The sifting processor 102 transmits and receives photon selection information to and from the sifting processor 202 of the receiver 2 through the classical communication channel based on the transmission signal bits and the transmission bases so as to perform the sifting processing to extract only the transmission signal bits corresponding to the parts where the reception bases agree with the transmission bases from among the photons detected by the photon detector 201 of the receiver 2, and thus to generate the shared bit sequence. The sifting processing will be described later in detail. The sifting processor 102 transmits the generated shared bit sequence to the error correction processor 109.

Step S14

The sifting processor 202 transmits and receives the photon selection information to and from the sifting processor 102 of the transmitter 1 through the classical communication channel based on the reception signal bits and the reception bases so as to perform the sifting processing to extract only the reception signal bits corresponding to the parts where the reception bases agree with the transmission bases from among the photons transmitted by the photon transmitter 101 of the transmitter 1 and detected by the photon detector 201 of the receiver 2, and thus to generate the shared bit sequence. The sifting processing will be described later in detail. The sifting processor 202 transmits the generated shared bit sequence to the error correction processor 209.

The photons transmitted from the transmitter 1 to the receiver 2 include, for example, noise on the optical fiber link 3 generated during the photon transmission/reception processing, noise caused by the characteristics of the APD of the receiver 2, or traces of eavesdropping by the eavesdropper, so that the shared bit sequence generated by the transmitter 1 and the shared bit sequence generated by the receiver may partially include different bits (bit errors).

Step S15

The error correction processor 109 exchanges the control information for error correction (EC information) with the error correction processor 209 of the receiver 2 through the classical communication channel so as to perform the error correction processing to correct the bit errors in the shared bit sequence to generate the corrected bit sequence. The error correction processor 109 transmits the corrected bit sequence thus generated to the privacy amplification processor 110.

Step S16

The error correction processor 209 exchanges the control information for error correction (EC information) with the error correction processor 109 of the transmitter 1 through the classical communication channel so as to perform the error correction processing to correct the bit errors in the shared bit sequence to generate the corrected bit sequence. The error correction processor 209 transmits the corrected bit sequence thus generated to the privacy amplification processor 210.

Step S17

The privacy amplification processor 110 generates the encryption key by applying the privacy amplification processing to the corrected bit sequence so as to discard the bits that may have been leaked and tapped by the eavesdropper in a theoretical sense through the photon transmission processing, the sifting processing, and the error correction processing. At this time, the privacy amplification processor 110 may exchange the control information (PA information) with the privacy amplification processor 210 of the receiver 2 through the classical communication channel. The privacy amplification processor 110 stores and accumulates the generated encryption key in the storage 111.

Step S18

The privacy amplification processor 210 generates the encryption key by applying the privacy amplification processing to the corrected bit sequence so as to discard the bits that may have been leaked and tapped by the eavesdropper in a theoretical sense through the photon transmission processing, the sifting processing, and the error correction processing. At this time, the privacy amplification processor 210 may exchange the control information (PA information) with the privacy amplification processor 110 of the transmitter 1 through the classical communication channel. The privacy amplification processor 210 stores and accumulates the generated encryption key in the storage 211.

The size of the encryption key generated by the privacy amplification processor 110 and the privacy amplification processor 210 is determined by statistical data obtained through the processes of the photon transmission/reception processing, the sifting processing, and the error correction processing, and by quantum cryptography.

The operation (quantum key distribution) described above generates the same encryption key shared between the transmitter 1 and the receiver 2. Repeating the above described operation repeatedly generates different encryption keys in a secure manner. In this case, an amount of generation of the encryption keys per unit time corresponds to the secure key rate (encryption key distribution rate or encryption key generation rate). The encryption keys generated by the operation described above are generally used for cryptographic communication such as one-time pad communication.

Figure 5:
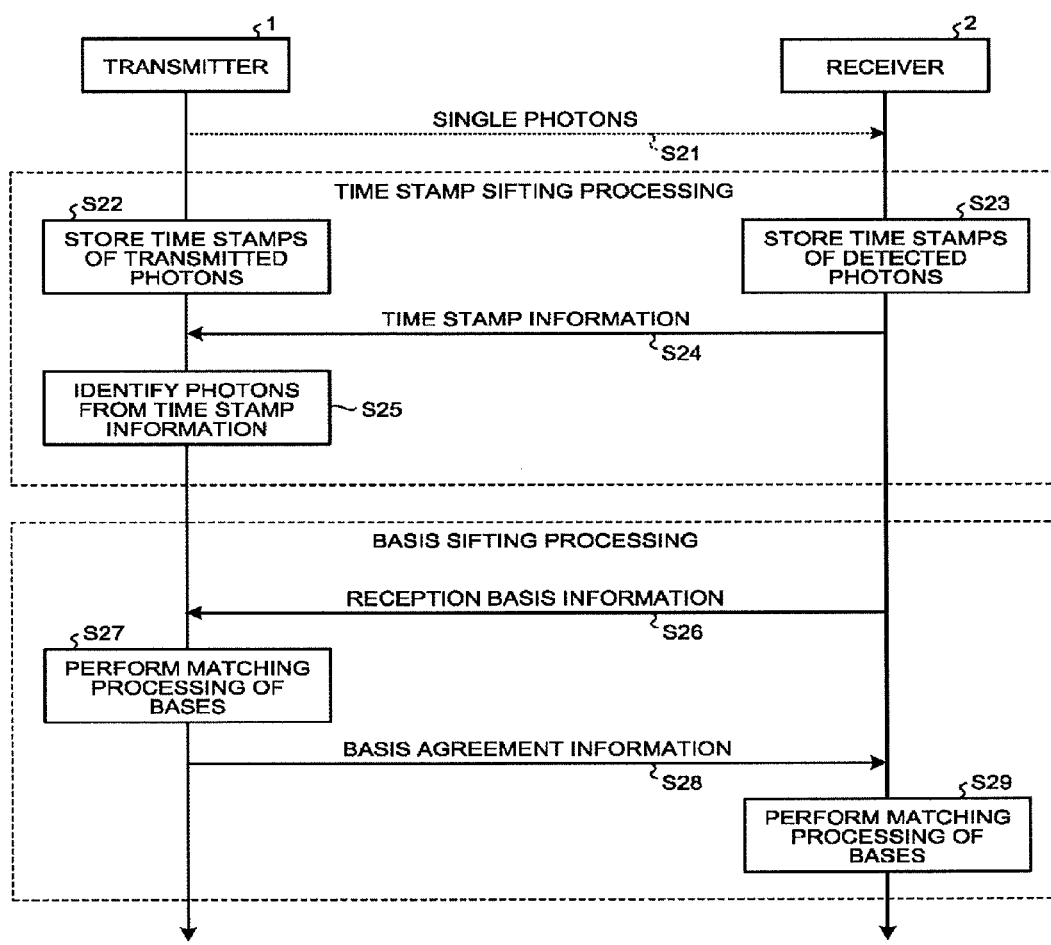
FIG. 5 is a sequence diagram illustrating an example of a flow of sifting processing.

FIG. 5 is a sequence diagram illustrating an example of a flow of the sifting processing. The operation of the sifting processing performed by the sifting processor 102 and the sifting processor 202 will be described with reference to FIG. 5. The sifting processing is broadly divided into the time stamp sifting processing and the basis sifting processing, as described above. Description will first be made of an outline of the time stamp sifting processing illustrated at Steps S21 to S25 of FIG. 5. The time stamp sifting processing is processing in which the transmitter 1 and the receiver 2 extract bits corresponding to the photons detected by the receiver 2 from among the photons transmitted by the transmitter 1.

Step S21

The photon transmitter 101 of the transmitter 1 transmits the single photons each generated so as to correspond to the phase state or the polarization state based on the transmission signal bit serving as the bit information generated, for example, using a random number and the basis information (transmission basis) generated and selected, for example, using a random number in the same manner as described above, to a photon detector 201 of the receiver 2 through the quantum communication channel. The photon transmitter 101 transmits the transmission signal bits and the transmission bases that have been generated to the sifting processor 102.

The photon detector 201 of the receiver 2 receives the photons transmitted from the photon transmitter 101 of the transmitter 1 through the quantum communication channel, and reads the received photons based on the randomly selected basis information (reception bases) so as to obtain the reception signal bit information corresponding to the transmission signal bit information. The photon detector 201 transmits the acquired reception signal bits and the generated reception bases to the sifting processor 202.

Step S22

The time stamp measurer 103 of the transmitter 1 measures the transmission time stamp information serving as the information indicating the time when the single photon was transmitted by the photon transmitter 101. The time stamp measurer 103 stores in the storage 111 the measured transmission time stamp information, together with the transmission signal bit information and the transmission basis information that have been received from the photon transmitter 101, as the "transmission photon information".

Step S23

The time stamp measurer 204 of the receiver 2 receives the reception signal bit information and the reception basis information corresponding to the detected photon from the photon detector 201, and measures the reception time stamp information serving as information indicating time when the photon is detected. The time stamp measurer 204 stores the reception signal bit information and the reception basis information as the "detection photon information" in the storage 211. Many of the single photons transmitted from the transmitter 1 to the receiver 2 are eliminated by attenuation, noise, and the like in the communication channel, so that only some of the photons stored as the "transmission photon information" in the transmitter 1 are measured for the time stamps by the time stamp measurer 204 of the receiver 2 and stored as the "detection photon information".

Step S24

The receiver 2 transmits (through the time stamp communication) the information on the time based on the reception time stamp information measured by the time stamp measurer 204 to the transmitter 1 through the data communication unit 214.

Step S25

The photon identifier 105 of the transmitter 1 compares the transmission time stamp information on the time when the single photon was transmitted that has been stored in the storage 111 at Step S22 with the reception time stamp information so as to identify which of the photons transmitted from the photon transmitter 101 has been detected by the receiver 2. When the transmission photon information turns out to correspond to the photon identified by the photon identifier 105 to be detected by the receiver 2, the transmission photon information is transmitted to the matching processor 108.

Steps S21 to S25 described above correspond to the outline of the time stamp sifting processing, by performing which, the transmitter 1 can identify the photon detected by the receiver 2. The time stamp sifting processing assumes that time synchronized between the transmitter 1 and the receiver 2 is available. That is, in the present embodiment, the transmitter 1 and the receiver 2 are synchronized in time in advance. The absolute time when the transmitter 1 transmits the single photon differs from the absolute time when the receiver 2 detects the single photon by at least a time determined by the distance of the optical fiber link 3 transmitting the single photon between the transmitter 1 and the receiver 2 and the speed of light. However, this difference is compensated in advance. The content of the time stamp sifting processing described above is merely an example. Other methods can be used for the time stamp sifting processing.

The time stamp information indicating the times measured by the time stamp measurer 103 and the time stamp measurer 204 is used in order to identify the bits corresponding to the photons detected by the receiver 2 from the photon data sequence of the transmitter 1. Hence, the times need not be absolute times, in this case. For example, the information on the time may be a sequence number value having a finite bit length that is incremented by one corresponding to the time when the transmitter 1 transmits the photon, and in which all the bits are reset to 0 after being all set to 1. For example, if the photon transmitter 101 has an operational rate of 1 GHz, the photons are transmitted at intervals of 1 ns. In this case, the value incremented at intervals of 1 ns is stored and accumulated in the storage 111, as the time stamp information serving as part of the transmission photon information. If the time stamp information has a length of 32 bits, the time stamp information is cycled at a period of four seconds. The operation of the time stamp sifting processing can be performed if the time stamp sifting processing can be completed and photons corresponding to the photons detected by the receiver 2 can all be identified out of the sequence of the photons transmitted by the transmitter 1 within a time interval equal to or shorter than the time interval of the above-mentioned cycle (equal to or shorter than four seconds in the example described above). That is, the bit length of the time stamp information is an item to be determined by the interval of transmission of the photons and the processing time of the time stamp sifting processing.

Secondly, description will be made of an outline of the basis sifting processing illustrated at Steps S26 to S29 of FIG. 5. The basis sifting processing is processing performed as follows: the transmitter 1 generates the shared bit sequence by extracting, from among the photons detected by the receiver 2 in the time stamp sifting processing, only the transmission signal bit information corresponding to the transmission basis agreeing with the reception basis selected by the receiver 2; and the receiver 2 generates the shared bit sequence by extracting, from among the photons detected by the receiver 2 in the time stamp sifting processing, only the reception signal bit information corresponding to the reception basis agreeing with the transmission basis selected by the transmitter 1.

Step S26

The basis information transmitter 207 of the receiver 2 transmits the reception basis information included in the "detection photon information" stored in the storage 211 to the transmitter 1 through the data communication unit 214 and the classical communication channel.

Step S27

The matching processor 108 of the transmitter 1 compares the reception bases received from the receiver 2 through the classical communication channel and the data communication unit 114 with the transmission bases included in the transmission photon information received from the photon identifier 105 so as to extract the transmission signal bits corresponding to bases where the reception bases agree with the transmission bases, and thus generates the shared bit sequence. The matching processor 108 obtains, as a result of the matching processing, the information (basis agreement information) on whether each of the received reception bases agrees with the corresponding transmission basis, and transmits the obtained information to the basis agreement information transmitter 107.

Step S28

The basis agreement information transmitter 107 of the transmitter 1 transmits the basis agreement information received from the matching processor 108 to the receiver 2 through the data communication unit 114 and the classical communication channel.

Step S29

The matching processor 208 of the receiver 2 extracts only the reception signal bits of the "detection photon information" having the reception bases agreeing with the transmission bases from the basis agreement information received from the transmitter 1 through the data communication unit 214 and the classical communication channel and the "detection photon information" stored in the storage 211, and thus generates the shared bit sequence.

Steps S26 to S29 described above correspond to the outline of the basis sifting processing, by performing which, both the transmitter 1 and the receiver 2 can select only the transmission signal bits and the reception signal bits, respectively, where the reception bases agree with the transmission bases.

Three type of information communications, that is, the time-stamp communication, the communication of the reception bases, and the communication of the basis agreement information occur in the sifting processing described above. These types of communications may be made through the communication cable 4 or the same optical fiber link 3 as that used for the transmission of the single photons, or may be made using a different optical fiber from that used for the transmission of the single photons. The three type of information communications may be made using optical fibers or communication cables different from one another. The time-stamp communication in the time stamp sifting processing and the communication of the reception bases in the basis sifting processing are information communications continuously performed in the same direction. Hence, a variation is possible in which these two types of communications are performed together at the same time.

For example, the following variations are possible in terms of units of processing in the sifting processing.

(A) The time stamp sifting processing and the basis sifting processing are performed each time a single photon is detected. That is, an operation is performed so as to generate a shared bit sequence consisting of one bit each time one single photon is detected.

(B) After a plurality of single photons are detected, the time stamp sifting processing and the basis sifting processing are collectively applied to the single photons.

(C) The time stamp sifting processing is performed each time a single photon is detected, and after a certain amount (such as N bits) of the transmission photon information and the detection photon information obtained as results of the time stamp sifting processing are accumulated, an operation is performed to connect the pieces of information and collectively apply the basis sifting processing thereto so as to generate a shared bit sequence consisting of the N bits.

While the sifting processing can be applied per any of the units of processing (A) to (C), the following description assumes the variation (C).

Figure 6:
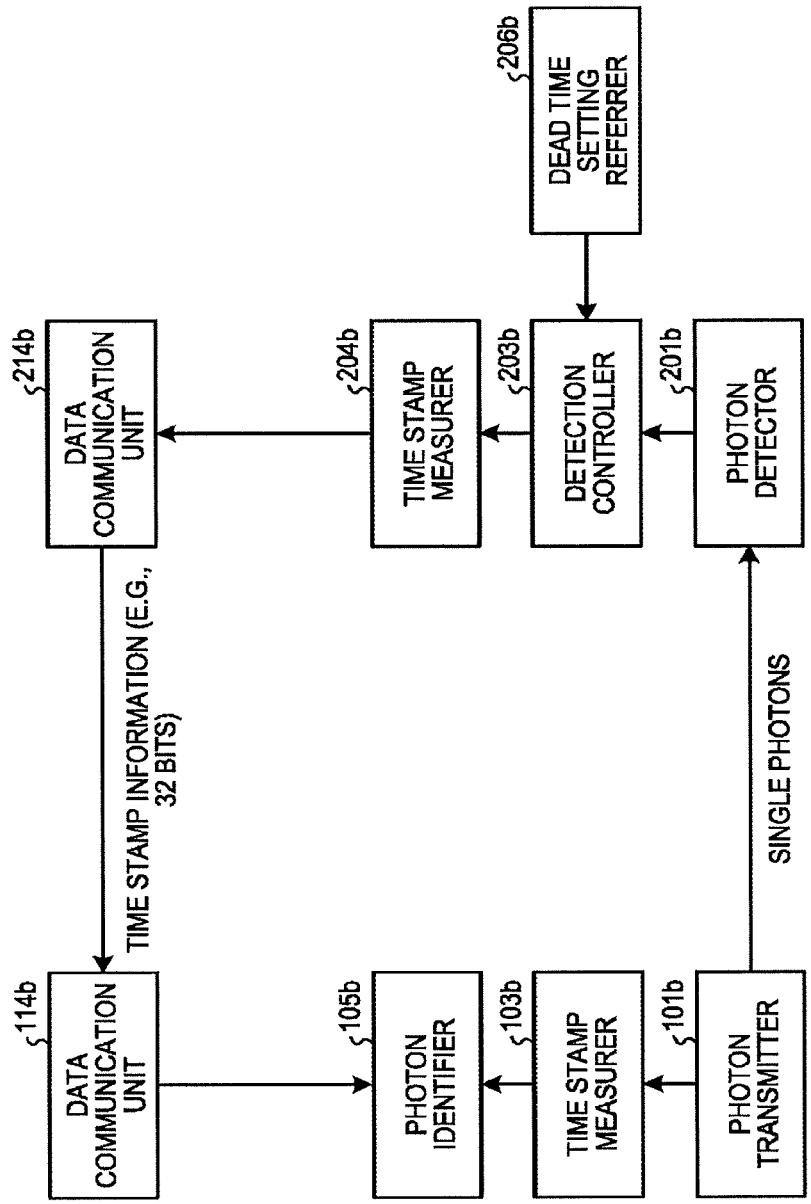
FIG. 6 is an explanatory diagram of operations of time stamp sifting processing using a conventional method (1)
Figure 7:
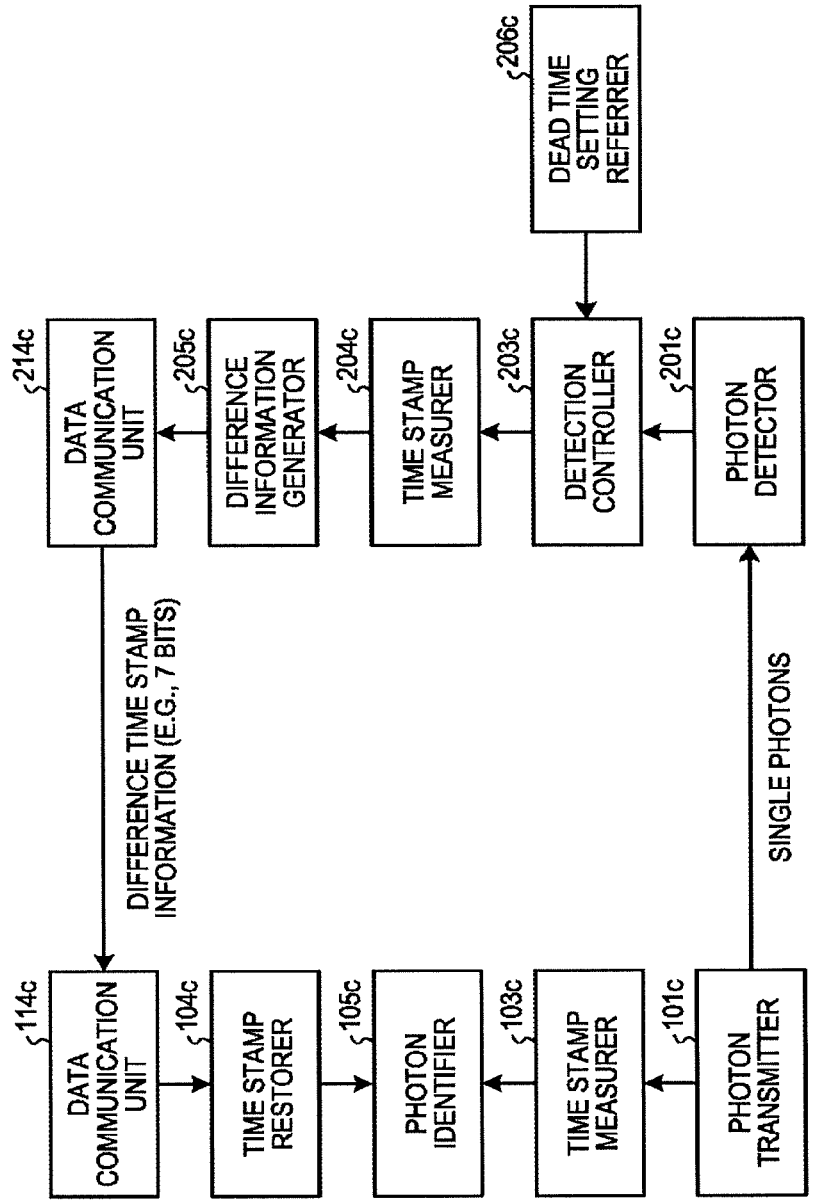
FIG. 7 is an explanatory diagram of operations of the time stamp sifting processing using a conventional method (2)
Figure 8A:
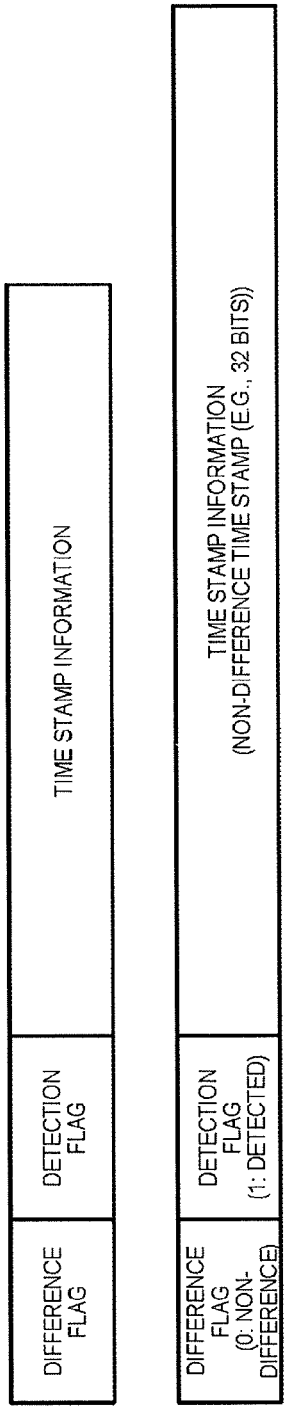
FIGS. 8A to 8D are diagrams illustrating examples of time stamp information transmitted and received using the conventional method (2)
Figure 8B:
Figure 8C:
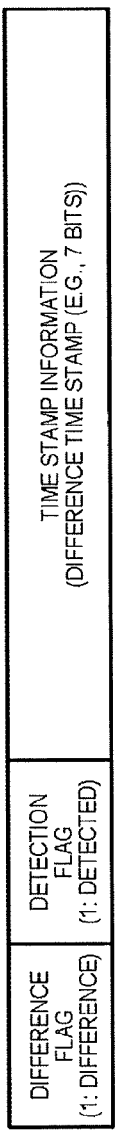
Figure 8D:
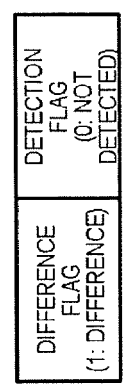
Figure 9:
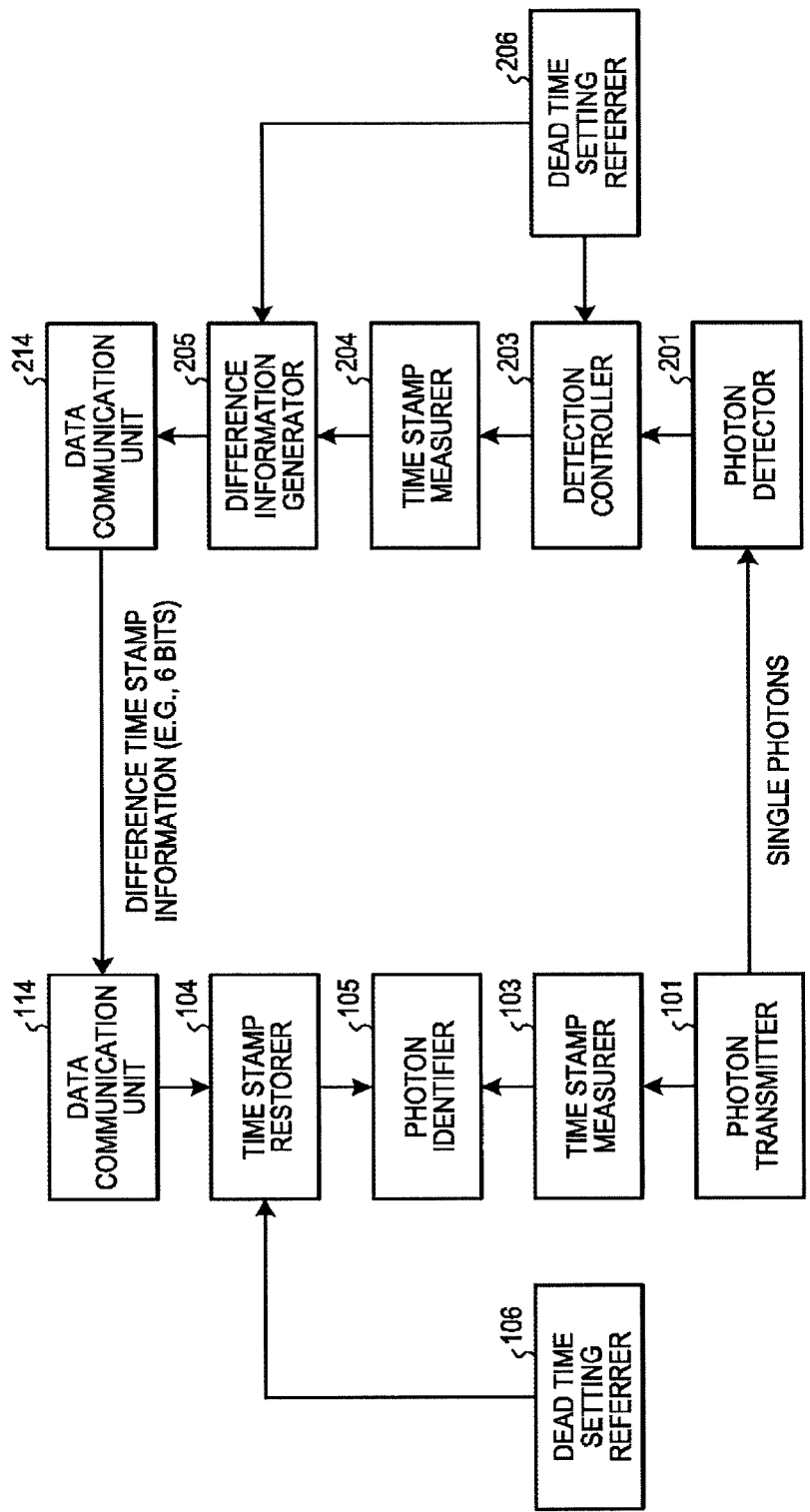
FIG. 9 is an explanatory diagram of operations of time stamp sifting processing of the first embodiment.

The following describes configurations and process flows regarding the time stamp sifting processing with reference to FIGS. 6 to 10. The following sequentially describes a conventional method (1) in FIG. 6, a conventional method (2) in FIGS. 7 and 8, and a method of the present embodiment in FIGS. 9 and 10. For convenience of description, the following includes description of the photon transmission/reception processing in addition to that of the time stamp sifting processing. FIGS. 6, 7, and 9 illustrate configurations obtained by extracting functional units responsible for the time stamp sifting processing and the photon transmission/reception processing.

FIG. 6 is diagram for explaining operations of the time stamp sifting processing using the conventional method (1). Description will first be made of the operations of the time stamp sifting processing using the conventional method (1), with reference to FIG. 6.

As illustrated in FIG. 6, a transmitter employing the conventional method (1) (hereinafter, simply called the "transmitter" in the explanation of FIG. 6) includes a photon transmitter 101b, a time stamp measurer 103b, a photon identifier 105b, a storage 111b, and a data communication unit 114b. A receiver employing the conventional method (1) (hereinafter, simply called the "receiver" in the explanation of FIG. 6) includes a photon detector 201b, a detection controller 203b, a time stamp measurer 204b, a dead time setting referrer 206b, a storage 211b, and a data communication unit 214b. The following describes the operations of the functional units listed above in the order along the flow of the time stamp sifting processing using the conventional method (1).

Time synchronized between the transmitter and the receiver is assumed to be available. That is, the time (time stamp) at which the transmitter transmits a photon is assumed to agree with the time (time stamp) at which the receiver detects the photon. As an example of a method for synchronizing the times, the time actually measured by the receiver is delayed by a certain time, taking into account a delay time consumed for transmitting the single photon through an optical fiber. Alternatively, if the time for transmitting the single photon through the optical fiber fluctuates, a method may be employed in which a difference in time between the receiver and the transmitter is compensated by taking the fluctuation into account.

The photon transmitter 101b transmits the single photons each generated so as to correspond to the phase state or the polarization state based on the photonic transmission signal bit serving as the bit information generated, for example, using a random number and the basis information (transmission basis) generated and selected, for example, using a random number in the same manner as described above, to the photon detector 201b of the receiver through the quantum communication channel. The photon transmitter 101b transmits the transmission signal bit information and the transmission basis information to the time stamp measurer 103b.

The time stamp measurer 103b measures the transmission time stamp information serving as the information indicating the time when the single photon was transmitted by the photon transmitter 101b. The time stamp measurer 103b stores in the storage 111b the transmission signal bit information, the transmission basis information, and the measured time stamp information, as the transmission photon information.

The photon detector 201b receives the photons transmitted from the photon transmitter 101b of the transmitter through the quantum communication channel, and reads the received photons based on the randomly selected basis information (reception bases) so as to obtain the reception signal bit information corresponding to the transmission signal bit information. The photon detector 201b transmits the reception signal bit information and the reception basis information to the detection controller 203b.

In order to restrain the erroneous detection of photons caused by the after-pulses of the APD of the photon detector 201b, the detection controller 203b restrains the photon detector 201b from performing, for example, the detection operation of photons or the transmission operation of photon detection signals for the predetermined time serving as the preset dead time referred to by the dead time setting referrer 206b after the photon detector 201b performs the detection of photons to be detected. The photon detector 201b is configured not to detect any photon while the detection operation is restrained. While the transmission operation of photon detection signals is restrained, the photon detector 201b operates and transmits the reception signal bit information and the reception basis information to the detection controller 203b, but these pieces of information are discarded. During a time outside the predetermined time period serving as the preset dead time, that is, when the restraint need not be made, the reception signal bit information and the reception basis information are transmitted to the time stamp measurer 204b.

The detection controller 203b uses the dead time setting referrer 206b to refer to the setting of the dead time for restraining the erroneous detection of photons caused by the after-pulses of the APD of the photon detector 201b.

The time stamp measurer 204b measures the reception time stamp information serving as the information indicating the time when the single photon was detected by the photon detector 201b. The time stamp measurer 204b transmits the measured reception time stamp information to the data communication unit 214b, and stores the reception signal bit information and the reception basis information that have been received, as the detection photon information, in the storage 211b.

The data communication unit 214b transmits the reception time stamp information serving as the information indicating the time measured by the time stamp measurer 204b, as the communication time stamp information, to the transmitter through the classical communication channel.

The data communication unit 114b receives the communication time stamp information from the receiver through the classical communication channel.

The photon identifier 105b compares the communication time stamp information received from the receiver, that is, the reception time stamp information indicating the time measured by the time stamp measurer 204b with the transmission time stamp information that is stored as the transmission photon information in the storage 111b and indicates the time measured by the time stamp measurer 103b so as to identify which of the photons transmitted from the photon transmitter 101b has been detected by the photon detector 201b. The photon identifier 105b stores the transmission signal bit information and the transmission bases included in the "transmission photon information" having the transmission time stamp information agreeing with the reception time stamp information, in the storage 111b. The above-described processing of the photon identifier 105b is a core process of the time stamp sifting processing, and can be used to select the transmission signal bit information and the transmission bases corresponding to the photons detected by the photon detector 201b.

As described above, in the conventional method (1), the information indicating the time itself (that is, the reception time stamp information) is transmitted as the communication time stamp information transmitted from the receiver to the transmitter, that is, from the data communication unit 214b to the data communication unit 114b. In this case, the time stamp information has an amount of data of, for example, 32 bits.

FIG. 7 is diagram for explaining operations of the time stamp sifting processing using the conventional method (2). FIGS. 8A to 8D are diagrams illustrating examples of the time stamp information transmitted and received using the conventional method (2). The following describes the operations of the time stamp sifting processing using the conventional method (2), with reference to FIGS. 7 and 8A to 8D.

As illustrated in FIG. 7, a transmitter employing the conventional method (2) (hereinafter, simply called the "transmitter" in the explanation of FIGS. 7 and 8A to 8D) includes a photon transmitter 101c, a time stamp measurer 103c, a time stamp restorer 104c, a photon identifier 105c, a storage 111c, and a data communication unit 114c. A receiver employing the conventional method (2) (hereinafter, simply called the "receiver" in the explanation of FIGS. 7 and 8A to 8D) includes a photon detector 201c, a detection controller 203c, a time stamp measurer 204c, a difference information generator 205c, a dead time setting referrer 206c, a storage 211c, and a data communication unit 214c. The following describes the operations of the functional units listed above in the order along the flow of the time stamp sifting processing using the conventional method (2).

Time synchronized between the transmitter and the receiver is assumed to be available, in the same manner as in the conventional method (1). Of the functional units of the transmitter and the receiver, the photon transmitter 101c, the time stamp measurer 103c, the photon detector 201c, the detection controller 203c, and the dead time setting referrer 206c have the same functions as those of the photon transmitter 101b, the time stamp measurer 103b, the photon detector 201b, the detection controller 203b, and the dead time setting referrer 206b, respectively, described for the conventional method (1). Accordingly, the description of the time stamp sifting processing using the conventional method (2) will focus on configurations and operations that differ from those for the time stamp sifting processing using the conventional method (1).

The time stamp measurer 204c measures the reception time stamp information serving as the information indicating the time when the single photon was detected by the photon detector 201c. The time stamp measurer 204c transmits the measured reception time stamp information to the difference information generator 205c, and stores the reception signal bit information and the reception basis information that have been received, as the "detection photon information", in the storage 211c. The time stamp measurer 204c may store the time stamp information obtained by each measurement operation in a cache memory or the like that allows high-speed reading.

The difference information generator 205c generates the difference time stamp information representing a difference between the currently measured reception time stamp information received from the time stamp measurer 204c and the reception time stamp information that has previously been received from the time stamp measurer 204c and is stored in the storage or the cache memory or the like. The reception time stamp information indicating the time itself measured by the time stamp measurer 204c is called "standard time stamp information" as opposed to the difference time stamp information. The difference information generator 205c stores the reception time stamp information currently measured by the time stamp measurer 204c in the cache memory (or the storage), and uses the stored reception time stamp information for the next difference information generation. The difference information generator 205c transmits the generated difference time stamp information to the data communication unit 214c.

As for the time stamp information obtained when the photon is first detected by the photon detector 201c for the first time immediately after the system has started, no corresponding time stamp information is stored as information obtained in the previous detection. Accordingly, the difference information generator 205c may directly transmit the reception time stamp information serving as the information indicating the time measured by the time stamp measurer 204c to the data communication unit 214c, in the same manner as in the conventional method (1). The difference information generator 205c may periodically or intermittently transmit the standard time stamp information, instead of always generating the difference time stamp information and transmitting it to the data communication unit 214c.

The difference time stamp information only needs to have a bit length long enough to represent the time difference under the assumption of a standard frequency at which the photon detector 201c detects photons. For example, when the photon detector 201c has an operating frequency of 1 GHz, a bit length of 7 bits of the difference time stamp information can represent the difference between the time stamp information previously measured by the time stamp measurer 204c and the time stamp information currently measured by the time stamp measurer 204c if the difference is 128 ns or shorter. If the next photon is not detected (the time stamp information is not measured by the time stamp measurer 204c) after 128 ns have elapsed from the time of the previous measurement of the time stamp information, a control signal indicating the absence of the time stamp information may be transferred to the data communication unit 214c, which in turn may transmit it to the transmitter. FIGS. 8A to 8D illustrate examples of frame formats representing the difference time stamp information.

FIG. 8A illustrates a format of information including the time stamp information transmitted from the receiver to the transmitter. The format of this information is constituted by a difference flag and a detection flag corresponding to a header, and by the time stamp information corresponding to optional data. The difference flag is a one-bit flag indicating whether the time stamp information included in the format is the difference time stamp information or the standard time stamp information. The detection flag is a one-bit flag indicating whether the data is transmitted to give notification that the photon detector 201c has detected a photon.

The information illustrated in FIG. 8B represents information in the case of transmitting the standard time stamp information used, for example, when the photon detector 201c has detected a photon for the first time immediately after the system has started. The information illustrated in FIG. 8B includes the standard time stamp information, so that the difference flag is "0" (not the difference time stamp information), the detection flag is "1" (detected), and the standard time stamp information (of, for example, 32 bits as indicated in the conventional method (1)) is included as the time stamp information.

The information illustrated in FIG. 8C represents information in the case of transmitting the difference time stamp information. The information illustrated in FIG. 8C includes the difference time stamp information, so that the difference flag is "1" (difference time stamp information), the detection flag is "1" (detected), and the difference time stamp information (of, for example, 7 bits as described above) is included as the time stamp information.

The information illustrated in FIG. 8D is information used for notification that is made if the next photon is not detected during a period from the time indicated by the time stamp information of the previous detection of a photon until the time (127 ns here) representable by the bit length (7 bits here) for representing the difference time stamp information elapses. The information illustrated in FIG. 8D is information in which the difference flag is "1" (or "0" or whichever), the detection flag is "0" (not detected), and the time stamp information is not included. A method may be employed in which dummy time stamp information is appended and transmitted.

The formats illustrated in FIGS. 8A to 8D are merely examples. For example, in order to use the time stamp information in the basis sifting processing subsequent to the time stamp sifting processing, one-bit information for indicating the reception basis information may be added so as to simultaneously transmit the reception basis information to be transmitted from the receiver 2 to the transmitter 1.

The data communication unit 214c transmits the difference time stamp information generated by the difference information generator 205c to the transmitter through the classical communication channel.

The data communication unit 114c receives the difference time stamp information from the receiver through the classical communication channel.

The time stamp restorer 104c restores the reception time stamp information (standard time stamp information) indicating the time when the photon detector 201c has currently detected the photon from the reception time stamp information (standard time stamp information) that is held by the time stamp restorer 104c and indicates the time when the photon detector 201c previously detected the photon and the difference time stamp information currently received from the receiver. The time stamp restorer 104c transmits the restored reception time stamp information (standard time stamp information) indicating the time when the photon detector 201c has currently detected the photon to the photon identifier 105c, and stores it in itself for the next time stamp restoration.

The photon identifier 105c compares the reception time stamp information (standard time stamp information) indicating the time restored by the time stamp restorer 104c with the transmission time stamp information that is stored in the storage 111c as the "transmission photon information" and indicates the time measured by the time stamp measurer 103c so as to identify which of the photons transmitted from the photon transmitter 101c has been detected by the photon detector 201c. The photon identifier 105c extracts the transmission signal bit information and the transmission bases included in the "transmission photon information" having the transmission time stamp information agreeing with the reception time stamp information, and stores the extracted pieces of information in the storage 111c. The above-described processing of the photon identifier 105c is a core process of the time stamp sifting processing, and can be used to select the transmission signal bit information and the transmission bases corresponding to the photons detected by the photon detector 201c.

As described above, in the conventional method (2), the difference time stamp information indicating the difference in time generated by the difference information generator 205c is transmitted as the time stamp information transmitted from the receiver to the transmitter, that is, from the data communication unit 214c to the data communication unit 114c. Consequently, whereas the time stamp information transmitted through the time stamp communication is the standard time stamp information (of, for example, 32 bits) in the conventional method (1), the time stamp information transmitted through the time stamp communication is the difference time stamp information (of, for example, 7 bits) in the conventional method (2). As a result, the band required for the time stamp communication in the conventional method (2) can be generally reduced from that required in the conventional method (1).

Figure 10:
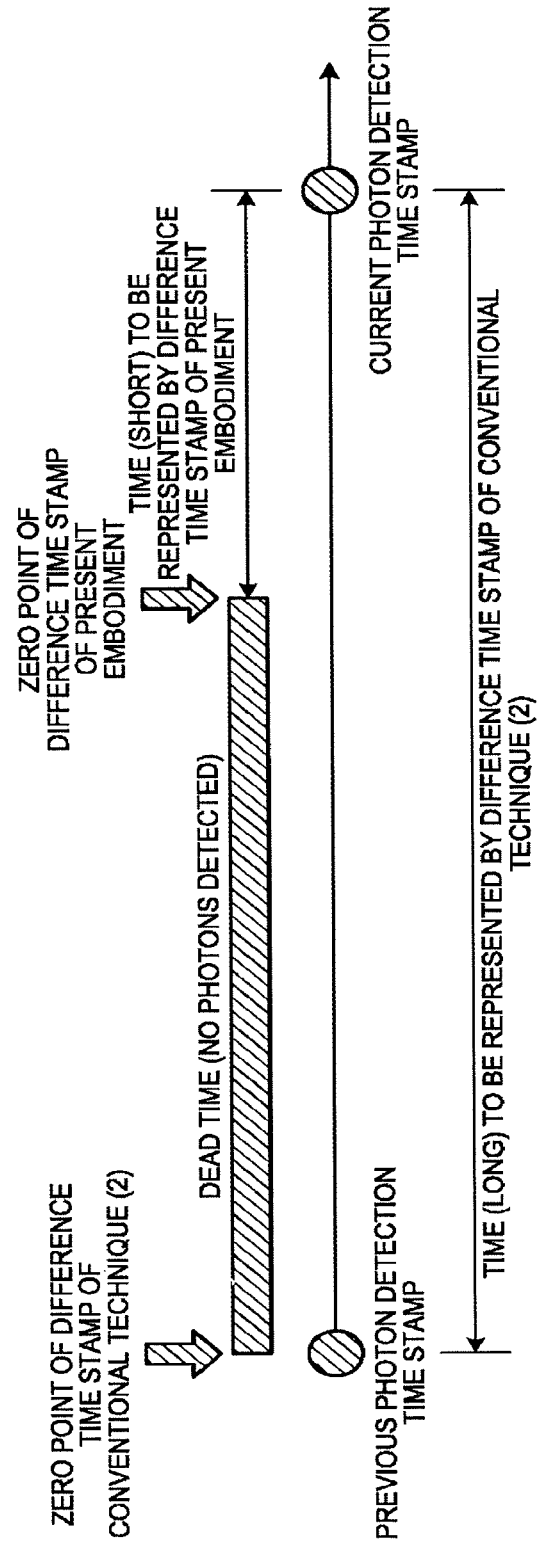
FIG. 10 is a diagram illustrating a zero point of the time stamp information in the first embodiment.

FIG. 9 is a diagram for explaining operations of the time stamp sifting processing by the quantum key distribution system according to the first embodiment. FIG. 10 is a diagram illustrating a zero point of the time stamp information in the first embodiment. The following describes the operations of the time stamp sifting processing of the present embodiment with reference to FIGS. 9 and 10.

As illustrated in FIG. 9, the transmitter 1 of the present embodiment includes the photon transmitter 101, the time stamp measurer 103, the photon identifier 105, the time stamp restorer 104, the dead time setting referrer 106, the storage 111, and the data communication unit 114, as described above with reference to FIG. 3. The receiver 2 of the present embodiment includes the photon detector 201, the detection controller 203, the time stamp measurer 204, the difference information generator 205 (difference generator), the dead time setting referrer 206, the storage 211, and the data communication unit 214, as described above with reference to FIG. 3. The following describes the operations of the functional units listed above in the order along the flow of the time stamp sifting processing of the present embodiment.

As described above, time synchronized between the transmitter 1 and the receiver 2 is assumed to be available. The basic operations of the functional units of the transmitter 1 and the receiver 2 illustrated in FIG. 9 are as described above with reference to FIG. 3. The description of the time stamp sifting processing of the present embodiment will focus on configurations and operations that differ from those for the time stamp sifting processing using the conventional method (2).

The difference information generator 205 generates the difference information (difference time stamp information) on the time when the single photon was detected based on the currently measured reception time stamp information received from the time stamp measurer 204, the reception time stamp information that has previously been received from the time stamp measurer 204 and is stored in the storage 211 or the cache memory or the like, and the dead time that has been referred to and acquired by the dead time setting referrer 206. Specifically, instead of generating the difference time stamp information as difference information between the standard time stamp information on the time when the single photon was previously detected and the currently measured standard time stamp information as in the conventional method (2), the difference information generator 205 generates the difference time stamp information as a difference between time obtained by adding the dead time set by the dead time setting referrer 206 to the time indicated by the standard time stamp information on the time when the single photon was previously detected and the time indicated by the currently measured standard time stamp information. That is, the difference time stamp information does not include the time period from the time indicated by the standard time stamp information on the time when the single photon was previously detected until the dead time elapses. During the time period from the time indicated by the standard time stamp information on the time when the single photon was previously detected until the dead time elapses, the detection controller 203 restrains the photon detector 201 from performing the detection operation of photons (from detecting photons or from performing the transmission operation of the photon detection signal). Therefore, the time represented by the difference time stamp information need not include the time period from the time indicated by the standard time stamp information on the time when the single photon was previously detected until the dead time elapses.

FIG. 10 illustrates a relation among the time indicated by the standard time stamp information on the time when the single photon was previously detected (expressed as "previous photon detection time stamp" in FIG. 10), the time indicated by the currently measured standard time stamp information (expressed as "current photon detection time stamp" in FIG. 10), and the dead time in a chronologically ordered manner. The difference time stamp information in the conventional method (2) represents the difference between the standard time stamp information on the time when the single photon was previously detected and the currently measured standard time stamp information. That is, a zero point of the difference time stamp information in the conventional method (2) corresponds to the time indicated by the standard time stamp information on the time when the single photon was previously detected. In contrast, the difference time stamp information in the present embodiment represents the difference between time obtained by adding the dead time during which no photons are detected, or no notification is made of the results of the photon detection to the time indicated by the standard time stamp information on the time when the single photon was previously detected and the time indicated by the currently measured standard time stamp information. That is, the zero point of the difference time stamp information in the present embodiment corresponds to the time obtained by adding the dead time during which no photons are detected, or no notification is made of the results of the photon detection to the time indicated by the standard time stamp information on the time when the single photon was previously detected. Due to the difference between the zero points, the width of time to be represented as the difference time stamp information is smaller in the present embodiment than in the case of the conventional method (2).

The data communication unit 214 transmits the difference time stamp information generated by the difference information generator 205 to the transmitter 1 through the classical communication channel.

The data communication unit 114 receives the difference time stamp information from the receiver 2 through the classical communication channel.

The dead time setting referrer 106 refers to the value of the dead time that has been set so as to restrain the erroneous detection of photons caused by the after-pulses of the APD of the photon detector 201.

The time stamp restorer 104 restores the time stamp information (standard time stamp information) on the time when the receiver 2 has detected the photon from the reception time stamp information (standard time stamp information) that is held by the time stamp restorer 104 and indicates the time when the photon detector 201 previously detected the photon, the difference time stamp information received by the data communication unit 114, and the dead time referred to by the dead time setting referrer 106. Specifically, the time stamp restorer 104 restores the time stamp information (standard time stamp information) on the time when the receiver 2 has currently detected the photon by adding a value obtained by adding the dead time to the difference time stamp information to the reception time stamp information (standard time stamp information) indicating the time when the photon detector 201 previously detected the photon. The time stamp restorer 104 transmits the restored time stamp information (standard time stamp information) indicating the time when the receiver 2 has currently detected the photon to the photon identifier 105, and stores it in itself for the next time stamp restoration.

As described above, in the present embodiment, unlike in the case of the conventional method (2), the difference time stamp information transmitted through the time stamp communication need not represent the time corresponding to the dead time, and thereby can be represented by a shorter bit length than in the case of the conventional method (2), so that the band required for the time stamp communication can be reduced.

The following quantitatively compares, by way of examples, data bands required for communication of the time stamp information in the time stamp sifting processing according to the conventional method (1), the conventional method (2), and the present embodiment. For example, it is assumed that the pulse driving rate in the photon transmission processing by the transmitter is 1 GHz, and a total loss of 20 dB is generated due to, for example, losses in the optical fiber for transmitting the photons and the efficiency of the APD, so that the receiver detects only one hundredth of photons transmitted by the transmitter. In this case, photons are detected at a frequency of once in 1 ns×100=100 ns on average. That is, the average rate of the photon detection processing is 10 million counts per second.

To transmit the time stamp information of 32 bits using the conventional method (1), a communication band of 32 bits/100 ns=320 Mbps is required for the time stamp information.

To transmit the difference time stamp information of 7 bits using the conventional method (2) and add the flags of 2 bits to a format of information including the difference time stamp information, a communication band of (7+2) bits/100 ns=90 Mbps is required for the time stamp information. The following describes the reason why the bit length of the difference time stamp information is set to 7 bits in the conventional method (2). When the bit length is 7 bits, the difference time stamp information can represent time of up to 128 ns. The average frequency of detection of photons is once in 100 ns. Hence, by being allowed, in the above-described manner, to represent a difference of up to 128 ns, which is longer than 100 ns, the difference time stamp information is considered to be capable of representing substantially all the detected photons.

In the present embodiment, to consider the bit length necessary for detecting photons with a time difference of up to 128 ns in the same manner as in the conventional method (2), the dead time for this case needs to be assumed. Thus, the value of the dead time is set to 70 ns. In this case, the difference time stamp information in the present embodiment actually needs to represent a time of 71 ns to 128 ns. When the zero point of the present embodiment illustrated in FIG. 10 is employed in consideration that the dead time is 70 ns, the difference time stamp information needs to represent time in the range from 1 ns to 58 ns, which includes 58 kinds of values. This range of values can be represented with 6 bits. Thus, when the flags of 2 bits are added to the format of information including the difference time stamp information, a communication band of (6+2) bits/100 ns=80 Mbps is required for the time stamp information. This value is smaller than that of the conventional method (2) by 10% or more, so that the required band is reduced. As described above, employing the time stamp sifting processing of the present embodiment can reduce the communication band of the time stamp information from that of the conventional method (2) by 10% or more.

As described above, in the present embodiment, unlike in the case of the conventional method (2), the difference time stamp information transmitted through the time stamp communication need not represent the time corresponding to the dead time, and thereby can be represented by a shorter bit length than in the case of the conventional method (2), so that the band required for the time stamp communication can be reduced. This reduction in the required band enables the high-speed time stamp sifting processing, and consequently, the high-speed quantum key distribution processing.

Second Embodiment

A quantum key distribution system according to a second embodiment will be described with a focus on differences from the quantum key distribution system 100 according to the first embodiment. The configuration of the quantum cryptographic communication system, the hardware configurations of the transmitter and the receiver, the encryption key sharing operation, and the sifting processing according to the present embodiment are roughly the same as those of the first embodiment.

Figure 11:
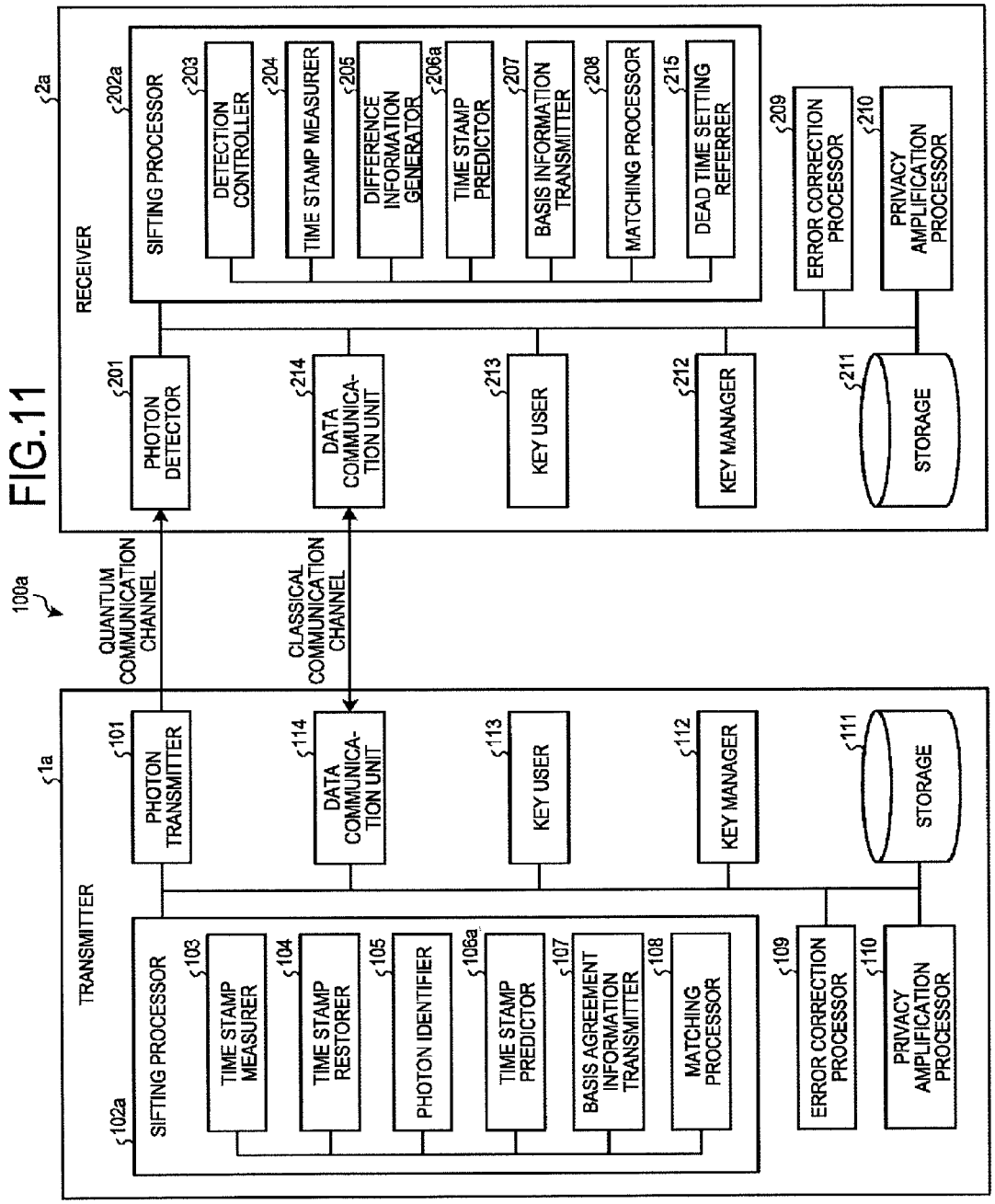
FIG. 11 is a diagram illustrating an example of a configuration of functional blocks in a second embodiment.

FIG. 11 is a diagram illustrating an example of a configuration of functional blocks in the quantum key distribution system according to the second embodiment. The following describes the configuration and operations of the functional blocks in a transmitter 1a and a receiver 2a of this quantum key distribution system 100a with reference to FIG. 11.

As illustrated in FIG. 11, the transmitter 1a (other communication device or second communication device) includes the photon transmitter 101, a sifting processor 102a, the error correction processor 109, the privacy amplification processor 110, the storage 111, the key manager 112, the key user 113, and the data communication unit 114 (receiver). Of these functional blocks, the photon transmitter 101, the error correction processor 109, the privacy amplification processor 110, the storage 111, the key manager 112, the key user 113, and the data communication unit 114 perform the same operations as those in the transmitter 1 of the first embodiment.

The sifting processor 102a is a functional unit that receives the basis information (reception basis) generated by the photon detector 201 of the receiver 2a through the classical communication channel, and performs the sifting processing to compare the received reception basis with the transmission basis to extract only transmission signal bits corresponding to the parts where the reception bases agree with the transmission bases so as to generate the shared bit sequence. The sifting processor 102a transmits the generated shared bit sequence to the error correction processor 109. The sifting processor 102a includes the time stamp measurer 103 (second measurer), the time stamp restorer 104 (restorer), the photon identifier 105 (identifier), a time stamp predictor 106a, the basis agreement information transmitter 107, and the matching processor 108. The basis agreement information transmitter 107 and the matching processor 108 perform the same operations as those in the transmitter 1 of the first embodiment. The operations of the time stamp measurer 103, the time stamp restorer 104, the photon identifier 105, and the time stamp predictor 106a will be described later with reference to FIGS. 12 and 13.

The sifting processor 102a, the error correction processor 109, the privacy amplification processor 110, the key manager 112, and the key user 113, which have been described above, are implemented, for example, by the CPU 301 illustrated in FIG. 2 that reads a program stored, for example, in the auxiliary storage device 305 into the RAM 303, and executes the program. The sifting processor 102a, the error correction processor 109, the privacy amplification processor 110, the key manager 112, and the key user 113 are not limited to being all implemented by execution of the program. At least any one of these units may be implemented, for example, as a hardware circuit, such as an ASIC, an FPGA, or another integrated circuit.

The photon transmitter 101, the sifting processor 102a, the time stamp measurer 103, the time stamp restorer 104, the photon identifier 105, the time stamp predictor 106a, the basis agreement information transmitter 107, the matching processor 108, the error correction processor 109, the privacy amplification processor 110, the storage 111, the key manager 112, the key user 113, and the data communication unit 114, which are illustrated in FIG. 11, are conceptual representations of the functions thereof, and are not limited to being configured in such a manner. For example, a plurality of functional units illustrated as independent functional units in the transmitter 1a illustrated in FIG. 11 may be configured as one functional unit. In a converse manner, a function provided by one functional unit in the transmitter 1a illustrated in FIG. 11 may be divided into a plurality of functions, and configured as a plurality of functional units.

As illustrated in FIG. 11, the receiver 2a (communication device or first communication device) includes the photon detector 201, a sifting processor 202a, the error correction processor 209 (corrector), the privacy amplification processor 210 (privacy amplifier), the storage 211, the key manager 212, the key user 213, and the data communication unit 214 (transmitter). Of these functional blocks, the photon detector 201, the error correction processor 209, the privacy amplification processor 210, the storage 211, the key manager 212, the key user 213, and the data communication unit 214 perform the same operations as those in the receiver 2 of the first embodiment.

The sifting processor 202a is a functional unit that receives the above-described basis agreement information generated by the basis agreement information transmitter 107 of the transmitter 1a through the classical communication channel, and performs the sifting processing to extract, from the photonic bit sequence, bits at which the reception bases are indicated by the received basis agreement information to agree with the transmission bases so as to generate the shared bit sequence. The sifting processor 202a transmits the generated shared bit sequence to the error correction processor 209. The sifting processor 202a includes the detection controller 203, the time stamp measurer 204 (measurer or first measurer), the difference information generator 205, a time stamp predictor 206a (predictor), the basis information transmitter 207, the matching processor 208, and a dead time setting referrer 215. The basis information transmitter 207 and the matching processor 208 perform the same operations as those in the receiver 2 of the first embodiment. The operations of the time stamp measurer 204, the difference information generator 205, and the time stamp predictor 206a will be described later with reference to FIGS. 12 and 13.

The sifting processor 202a, the error correction processor 209, and the privacy amplification processor 210, which have been described above, are implemented, for example, by the CPU 301 illustrated in FIG. 2 that reads a program stored, for example, in the auxiliary storage device 305 into the RAM 303, and executes the program. The sifting processor 202a, the error correction processor 209, and the privacy amplification processor 210 are not limited to being all implemented by execution of the program. At least any one of these units may be implemented, for example, as a hardware circuit, such as an ASIC, an FPGA, or another integrated circuit.

The photon detector 201, the sifting processor 202a, the time stamp measurer 204, the difference information generator 205, the time stamp predictor 206a, the basis information transmitter 207, the matching processor 208, the error correction processor 209, the privacy amplification processor 210, the storage 211, and the data communication unit 214, which are illustrated in FIG. 11, are conceptual representations of the functions thereof, and are not limited to being configured in such a manner. For example, a plurality of functional units illustrated as independent functional units in the receiver 2a illustrated in FIG. 11 may be configured as one functional unit. In a converse manner, a function provided by one functional unit in the receiver 2a illustrated in FIG. 11 may be divided into a plurality of functions, and configured as a plurality of functional units.

Figure 12:
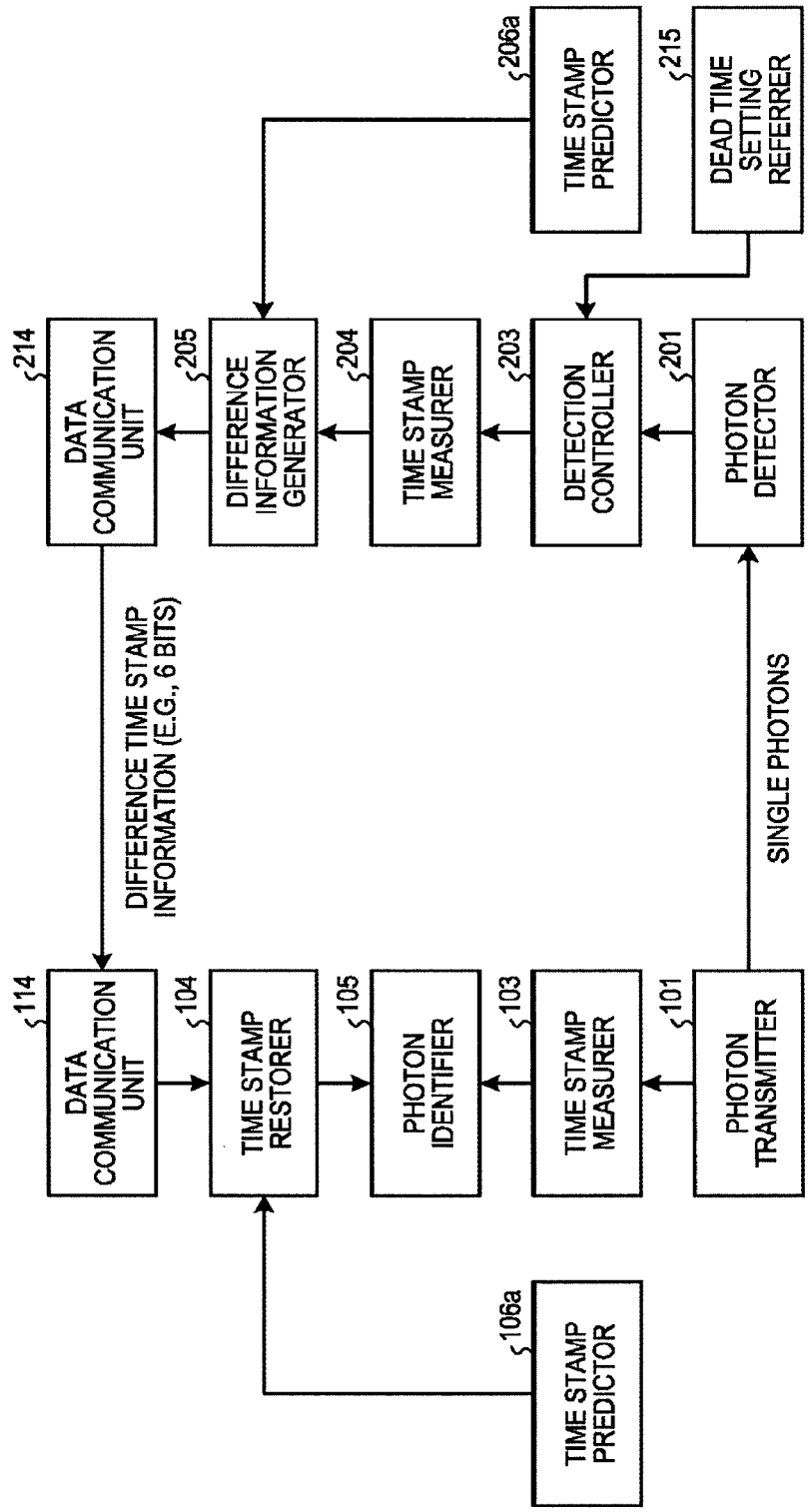
FIG. 12 is an explanatory diagram of operations of time stamp sifting processing of the second embodiment.
Figure 13:
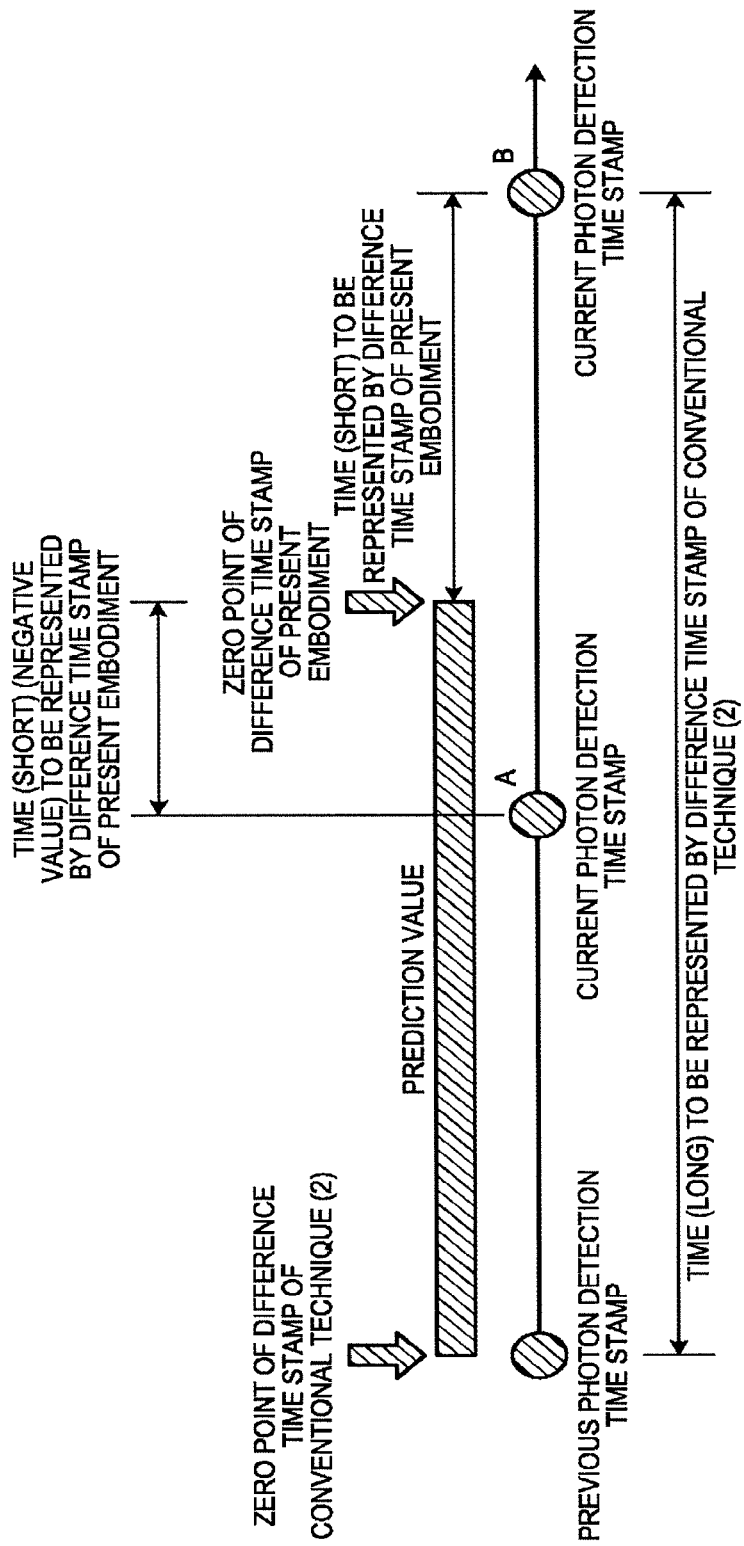
FIG. 13 is a diagram illustrating the zero point of the time stamp information in the second embodiment.

FIG. 12 is a diagram for explaining operations of the time stamp sifting processing by the quantum key distribution system according to the second embodiment. FIG. 13 is a diagram illustrating the zero point of the time stamp information in the second embodiment. The following describes the operations of the time stamp sifting processing of the present embodiment with reference to FIGS. 12 and 13.

As illustrated in FIG. 12, the transmitter 1a of the present embodiment includes the photon transmitter 101, the time stamp measurer 103, the photon identifier 105, the time stamp restorer 104, the time stamp predictor 106a, and the data communication unit 114, as described above with reference to FIG. 11. The receiver 2a of the present embodiment includes the photon detector 201, the detection controller 203, the time stamp measurer 204, the difference information generator 205, the time stamp predictor 206a, the data communication unit 214, and the dead time setting referrer 215, as described above with reference to FIG. 11. The following describes the operations of the functional units listed above in the order along the flow of the time stamp sifting processing of the present embodiment. Time synchronized between the transmitter 1a and the receiver 2a is assumed to be available.

The photon transmitter 101 transmits the single photon generated so as to correspond to the phase state or the polarization state based on the photonic transmission signal bit serving as the bit information generated, for example, using a random number and the basis information (transmission basis) generated and selected, for example, using a random number in the same manner as described above, to a photon detector 201 of the receiver 2a through the quantum communication channel. The photon transmitter 101 transmits the transmission signal bit information and the transmission basis information to the time stamp measurer 103.

The time stamp measurer 103 measures the transmission time stamp information (standard time stamp information) (second time stamp information) serving as the information indicating the time when the single photon was transmitted by the photon transmitter 101. The time stamp measurer 103 stores the transmission signal bit information, the transmission basis information, and the measured time stamp information, as the transmission photon information, in the storage 111.

The photon detector 201 receives the photons transmitted from the photon transmitter 101 of the transmitter 1a through the quantum communication channel, and reads the received photons based on the randomly selected basis information (reception bases) so as to obtain the reception signal bit information corresponding to the transmission signal bit information. The photon detector 201 transmits the reception signal bit information and the reception basis information to the detection controller 203.

In order to restrain the erroneous detection of photons caused by the after-pulses of the APD of the photon detector 201, the detection controller 203 restrains the photon detector 201 from performing, for example, the detection operation of photons or the transmission operation of photon detection signals for the predetermined time serving as the preset dead time referred to by the dead time setting referrer 215 after the photon detector 201 performs the detection of photons to be detected. The photon detector 201 is configured not to detect any photon while the detection operation is restrained. While the transmission operation of photon detection signals is restrained, the photon detector 201 operates and transmits the reception signal bit information and the reception basis information to the detection controller 203, but these pieces of information are discarded. During a time outside the predetermined time period serving as the preset dead time, that is, when the restraint need not be made, the reception signal bit information and the reception basis information are transmitted to the time stamp measurer 204.

The detection controller 203 uses the dead time setting referrer 215 to refer to the setting of the dead time for restraining the erroneous detection of photons caused by the after-pulses of the APD of the photon detector 201.

The time stamp measurer 204 measures the reception time stamp information (standard time stamp information) (first time stamp information) serving as the information indicating the time when the single photon was detected by the photon detector 201. The time stamp measurer 204 transmits the measured reception time stamp information to the difference information generator 205, and stores the reception signal bit information and the reception basis information that have been received, as the "detection photon information", in the storage 211. The time stamp measurer 204 may store the measured time stamp information in a cache memory or the like that allows high-speed reading.

The time stamp predictor 206a predicts a time period from when the photon detector 201 detected a photon until it detects the next photon. The time stamp predictor 206a stores the predicted time period as a prediction value (example of particular information or predicted time) in the storage 211. The time stamp predictor 206a predicts the time period (prediction value) from when the photon was previously detected until the next photon is detected, based on the difference in the time stamp information on the photon detection, or on the value of the average photon detection rate.

The difference information generator 205 generates the difference information (difference time stamp information) on the time when the single photon is detected based on the currently measured reception time stamp information received from the time stamp measurer 204, the reception time stamp information that has previously been received from the time stamp measurer 204 and is stored in the storage 211 or the cache memory or the like, and the prediction value predicted by the time stamp predictor 206a. Specifically, the difference information generator 205 generates the difference time stamp information as a difference between time obtained by adding the prediction value predicted by the time stamp predictor 206a to the time indicated by the standard time stamp information on the time when the single photon was previously detected and the time indicated by the currently measured standard time stamp information.

FIG. 13 illustrates a relation among the time indicated by the standard time stamp information on the time when the single photon was previously detected (expressed as "previous photon detection time stamp" in FIG. 13), the time indicated by the currently measured standard time stamp information (expressed as "current photon detection time stamp" as indicated by points A and B in FIG. 13), and the prediction value in a chronologically ordered manner. The difference time stamp information in the conventional method (2) represents the difference between the standard time stamp information on the time when the single photon was previously detected and the currently measured standard time stamp information. That is, the zero point of the difference time stamp information in the conventional method (2) corresponds to the time indicated by the standard time stamp information on the time when the single photon was previously detected. In contrast, the difference time stamp information in the present embodiment represents the difference between time obtained by adding the prediction value predicted by the time stamp predictor 206a to the time indicated by the standard time stamp information on the time when the single photon was previously detected and the time indicated by the currently measured standard time stamp information. That is, the zero point of the difference time stamp information in the present embodiment corresponds to the time obtained by adding the prediction value predicted by the time stamp predictor 206a to the time indicated by the standard time stamp information on the time when the single photon was previously detected. The time stamp predictor 206a obtains the prediction value of the time period until the time when the next photon is detected. As a result, the (currently measured) standard time stamp information on the time when the single photon is actually detected represents time (at point A) before the zero point of the difference time stamp information of the present embodiment in some cases, or represents time (at point B) after the zero point in other cases, as illustrated in FIG. 13. The difference time stamp information of the present embodiment may have a negative value, as in the case of the time (at point A) before the zero point. In either type of case, the width of time to be represented as the difference time stamp information is smaller in the present embodiment than in the case of the conventional method (2).

The data communication unit 214 transmits the difference time stamp information generated by the difference information generator 205 to the transmitter 1a through the classical communication channel.

The data communication unit 114 receives the difference time stamp information from the receiver 2a through the classical communication channel.

The time stamp predictor 106a predicts a time period from when the photon detector 201 detected a photon until it detects the next photon. The time stamp predictor 106a stores the predicted time period as a prediction value in the storage 111. The time stamp predictor 106a of the transmitter 1a described above sets the same prediction value as that set by the time stamp predictor 206a of the receiver 2a. In this case, any method can be used to keep the time stamp predictor 106a and the time stamp predictor 206a to have the same prediction value as each other. The prediction value of the time stamp predictor 106a of the transmitter 1a may be changed by the operator who manually copies thereto the value of the time stamp predictor 206a of the receiver 2a, or by automatically transmitting the prediction value of the time stamp predictor 206a of the receiver 2a to the transmitter 1a when the prediction value of the time stamp predictor 206a is changed. In a converse manner, the prediction value of the time stamp predictor 206a of the receiver 2a may be changed by automatically transmitting the prediction value of the time stamp predictor 106a of the transmitter 1a to the receiver 2a when the prediction value of the time stamp predictor 106a is changed.

The time stamp restorer 104 restores the time stamp information (standard time stamp information) on the time when the receiver 2a detected the photon from the reception time stamp information (standard time stamp information) that is held by the time stamp restorer 104 and indicates the time when the photon detector 201 previously detected the photon, the difference time stamp information received by the data communication unit 114, and the prediction value predicted by the time stamp predictor 106a. Specifically, the time stamp restorer 104 restores the time stamp information (standard time stamp information) on the time when the receiver 2a has currently detected the photon by adding a value obtained by adding the prediction value to the difference time stamp information to the reception time stamp information (standard time stamp information) indicating the time when the photon detector 201 previously detected the photon. The time stamp restorer 104 transmits the restored time stamp information (standard time stamp information) indicating the time when the receiver 2a has currently detected the photon to the photon identifier 105, and stores it in itself for the next time stamp restoration.

The photon identifier 105 compares the reception time stamp information (standard time stamp information) restored by the time stamp restorer 104 with the transmission time stamp information that is stored in the storage 111 as the "transmission photon information" and indicates the time measured by the time stamp measurer 103 so as to identify which of the photons transmitted from the photon transmitter 101 has been detected by the photon detector 201. The photon identifier 105 extracts the transmission signal bit information and the transmission bases included in the "transmission photon information" having the transmission time stamp information agreeing with the reception time stamp information, and stores the extracted pieces of information in the storage 111. The above-described processing of the photon identifier 105 is a core process of the time stamp sifting processing, and can be used to select the transmission signal bit information and the transmission bases corresponding to the photons detected by the photon detector 201.

As described above, in the present embodiment, unlike in the case of the conventional method (2), the difference time stamp information transmitted through the time stamp communication need not represent the prediction value for the time period from when the photon detector 201 detected a photon until it detects the next photon, and thereby can be represented by a shorter bit length than in the case of the conventional method (2), so that the band required for the time stamp communication can be reduced. This reduction in the required band enables the high-speed time stamp sifting processing, and consequently, the high-speed quantum key distribution processing.

The programs to be executed by each of the transmitter and the receiver according to either of the embodiments described above may be provided, for example, by being incorporated in, for example, the ROM 302 in advance.

The programs to be executed by each of the transmitter and the receiver according to either of the embodiments described above may be recorded as files in an installable format or an executable format on a computer-readable recording medium, such as a compact disc read-only memory (CD-ROM), a flexible disk (FD), a compact disc recordable (CD-R), or a digital versatile disc (DVD), and provided as a computer program product.

The programs to be executed by each of the transmitter and the receiver according to either of the embodiments described above may be stored on a computer connected to a network, such as the Internet, and provided by being downloaded through the network, or may alternatively be provided or distributed through a network, such as the Internet.

The programs to be executed by each of the transmitter and the receiver according to either of the embodiments described above can cause a computer to function as the functional units of each of the nodes described above. On this computer, the CPU 301 can read the programs from the computer-readable recording medium into a main memory to execute the programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device connected to another communication device through a quantum communication channel and a classical communication channel to share an encryption key with the another communication device, the communication device comprising:
- a photon detector configured to detect photons transmitted from the another communication device through the quantum communication channel;
- a measurer configured to measure time when each of the photons is detected by the photon detector as time stamp information;
- a difference generator configured to generate difference time stamp information as a difference between time obtained by adding time information to the time indicated by the time stamp information previously measured by the measurer and time indicated by the time stamp information subsequently measured by the measurer; and
- a transmitter configured to transmit the difference time stamp information to the another communication device through the classical communication channel.

2. The communication device according to claim 1, further comprising a referrer configured to refer to setting information on a dead time serving as a time period during which no photons are detected, or detection signals of the photons are restrained, the time period starting from the time when the photon is detected by the photon detector, wherein
the difference generator generates, as the difference time stamp information, a difference between time obtained by adding the dead time serving as the time information to the time indicated by the time stamp information previously measured by the measurer and time indicated by the time stamp information subsequently measured by the measurer.

3. The communication device according to claim 2, further comprising a detection controller configured to prevent the photon detector from detecting photons, or restrain the photon detector from issuing the detection signals, during a time period of the dead time that starts from the time when the photon is detected.

4. The communication device according to claim 2, wherein the photon detector detects the photon using an avalanche photodiode.

5. The communication device according to claim 1, further comprising a predictor configured to obtain a predicted time from when the photon is detected by the photon detector until a next photon is detected, wherein
the difference generator generates, as the difference time stamp information, a difference between time obtained by adding the predicted time serving as the time information to the time indicated by the time stamp information previously measured by the measurer and time indicated by the time stamp information subsequently measured by the measurer.

6. The communication device according to claim 1, further comprising a matching processor configured to generate a shared bit sequence by extracting bits corresponding to bases where transmission bases of the another communication device agree with reception bases of the communication device from bit information corresponding to a sequence of photons constituted by the photons detected by the photon detector.

7. The communication device according to claim 6, further comprising:
- a corrector configured to generate a corrected bit sequence by performing error correction processing to correct errors included in the shared bit sequence; and
- a privacy amplifier configured to generate the encryption key by performing privacy amplification processing to compress the corrected bit sequence.

8. A quantum key distribution system comprising:
a first communication device; and
a second communication device connected to the first communication device through a quantum communication channel and a classical communication channel to share an encryption key among the first communication device and the second communication device, wherein
the first communication device includes
- a photon detector configured to detect photons transmitted from the second communication device through the quantum communication channel;
- a first measurer configured to measure time when each of the photons is detected by the photon detector as first time stamp information;
- a difference generator configured to generate difference time stamp information as a difference between time obtained by adding time information to the time indicated by the first time stamp information previously measured by the first measurer and time indicated by the first time stamp information subsequently measured by the first measurer; and
- a transmitter configured to transmit the difference time stamp information to the second communication device through the classical communication channel, and the second communication device includes
- a photon transmitter configured to transmit the photons to the photon detector through the quantum communication channel;
- a second measurer configured to measure time when each of the photons is transmitted to the photon transmitter as second time stamp information;
- a receiver configured to receive the difference time stamp information from the transmitter through the classical communication channel;
- a restorer configured to restore the time when the photon is detected by the photon detector based on the difference time stamp information, the previous second time stamp information, and the time information; and
- an identifier configured to compare the time restored by the restorer with the second time stamp information so as to identify which of the photons transmitted by the photon transmitter has been detected by the photon detector.

9. A quantum key distribution method for a communication device connected to another communication device through a quantum communication channel and a classical communication channel to share an encryption key with the another communication device, the method comprising:
- detecting photons transmitted from the another communication device through the quantum communication channel;
- measuring time when each of the photons is detected as time stamp information;
- generating difference time stamp information as a difference between time obtained by adding time information to the time indicated by the previously measured time stamp information and time indicated by the subsequently measured time stamp information; and
- transmitting the difference time stamp information to the another communication device through the classical communication channel.

10. A computer program product comprising a computer-readable medium containing a program, wherein the program, when executed by a computer included in a communication device connected to another communication device through a quantum communication channel and a classical communication channel to share an encryption key with the another communication device, causes the computer to execute:
- measuring, as time stamp information, time when each of photons is detected by a photon detector, the photons being transmitted from the another communication device through the quantum communication channel; and
- generating difference time stamp information to be transmitted to the another communication device, as a difference between time obtained by adding time information to the time indicated by the previously measured time stamp information and time indicated by the subsequently measured time stamp information.

* * * * *